US012452116B2

(12) United States Patent
Furuichi

(10) Patent No.: US 12,452,116 B2
(45) Date of Patent: Oct. 21, 2025

(54) COMMUNICATION CONTROL DEVICE AND COMMUNICATION CONTROL METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 268 days.

(21) Appl. No.: 18/040,875

(22) PCT Filed: Aug. 12, 2021

(86) PCT No.: PCT/JP2021/029744
§ 371 (c)(1),
(2) Date: Feb. 7, 2023

(87) PCT Pub. No.: WO2022/039102
PCT Pub. Date: Feb. 24, 2022

(65) Prior Publication Data
US 2023/0291625 A1 Sep. 14, 2023

(30) Foreign Application Priority Data
Aug. 20, 2020 (JP) ................. 2020-139376

(51) Int. Cl.
*H04W 52/24* (2009.01)
*H04B 17/336* (2015.01)
*H04L 27/26* (2006.01)

(52) U.S. Cl.
CPC ....... *H04L 27/2605* (2013.01); *H04B 17/336* (2015.01)

(58) Field of Classification Search
CPC ............................. H04W 52/24; H04W 52/36
See application file for complete search history.

(56) References Cited

U.S. PATENT DOCUMENTS

2008/0070586 A1\* 3/2008 Kermoal ............... H04W 16/04
455/452.2
2019/0222339 A1 7/2019 Badic et al.
(Continued)

FOREIGN PATENT DOCUMENTS

| WO | 2018/020799 A1 | 2/2018 |
|---|---|---|
| WO | 2020/137922 A1 | 7/2020 |
| WO | WO-2020137915 A1 | 7/2020 |

OTHER PUBLICATIONS

International Search Report and Written Opinion of PCT Application No. PCT/JP2021/029744, issued on Oct. 19, 2021, 08 pages of ISRWO.

(Continued)

*Primary Examiner* — Zhiren Qin
(74) *Attorney, Agent, or Firm* — CHIP LAW GROUP

(57) ABSTRACT

A communication control device according to an aspect of the present disclosure includes an interference ratio calculating unit that calculates an adjacent channel interference ratio between a first radio system, which is a protection target, and a second radio system, which is an interference source, when the second radio system shares and uses radio wave used by the first radio system and a guard band calculating unit that calculates a guard band necessary for a channel of the first radio system or the second radio system based on the adjacent channel interference ratio.

11 Claims, 14 Drawing Sheets

(56) References Cited

U.S. PATENT DOCUMENTS

2019/0239165 A1\* 8/2019 Furuichi ............... H04W 16/14
2019/0335336 A1 10/2019 Cimpu et al.
2020/0154415 A1\* 5/2020 Oh ...................... H04W 72/53
2022/0330274 A1\* 10/2022 Zhou ..................... H04L 5/0094

OTHER PUBLICATIONS

"CBRS Coexistence Technical Specification", Citizens Broadband Radio Service, CBRS Alliance, CBRSA-TS-2001, Version 1.0.0, Feb. 1, 2018, 20 pages.
"Requirements for Commercial Operation in the U.S. 3550-3700 MHz Citizens Broadband Radio Service Band", Wireless Innovation Forum, WINNF-TS-0112, Version V1.10.0, Dec. 12, 2022, 81 pages.
"Technical and operational requirements for the operation of white space devices under geo-location approach", ECC Report 186, Electronic Communications Committee (ECC), CEPT, Jan. 2013, 181 pages.
"The Wireless Telegraphy (White SpaceDevices) (Exemption) Regulations 2015", Electronic Communications, Statutory Instruments, No. 2066, Dec. 31, 2015, 9 pages.
"Signaling Protocols and Procedures for Citizens Broadband Radio Service (CBRS): WInnForum Recognized CBRS Grouping Information", Wireless Innovation Forum, WINNF-SSC-0010, Version 4.2.0, Jun. 30, 2021, 11 pages.
"47 CFR Part 96—Citizens Broadband Radio Service", Federal Communications Commissions (FCC), Code of Federal Regulations (CFR), Dec. 29, 2022, pp. 1-24.
"Evolved Universal Terrestrial Radio Access (E-UTRA); Base Station (BS) radio transmission and reception", 3rd Generation Partnership Project (3GPP), Technical Specification 36.104, 2022.
"NR; Base Station (BS) radio transmission and reception", 3rd Generation Partnership Project (3GPP), Technical specification 38.104, 2022.
"White Space Devices (WSD); Wireless Access Systems operating in the 470 MHz to 790 MHz TV broadcast band; Harmonized EN covering the essential requirements of article 3.2 of the R&TTE Directive", European Telecommunications Standards Institute (ETSI), EN 301 598, Version 1.1.1 Apr. 2014, 72 pages.
"Prediction procedure for the evaluation of interference between stations on the surface of the Earth at frequencies above about 0.1 GHZ", International Telecommunication Union, ITU-R p. 452-16, Jul. 2015, 59 pages.
"RAN4#83 Meeting report", 3GPP Draft; RAN4-83 Main Session Chairman Notes_Tuesday Afternoon_V2, 3rd Generation Partnership Project (3GPP), May 17, 2017 (May 17, 2017), vol. RAN WG4, No. Berlin, Germany, XP051276723.
Lukasz Kulacz et al, "Coordinated Spectrum Allocation and Coexistence Management in CBRS-SAS Wireless Networks", IEEE Access, Sep. 10, 2019 (Sep. 10, 2019), pp. 1-1, XP055625167, DOI: 10.1109/ACCESS.2019.2940448.

\* cited by examiner

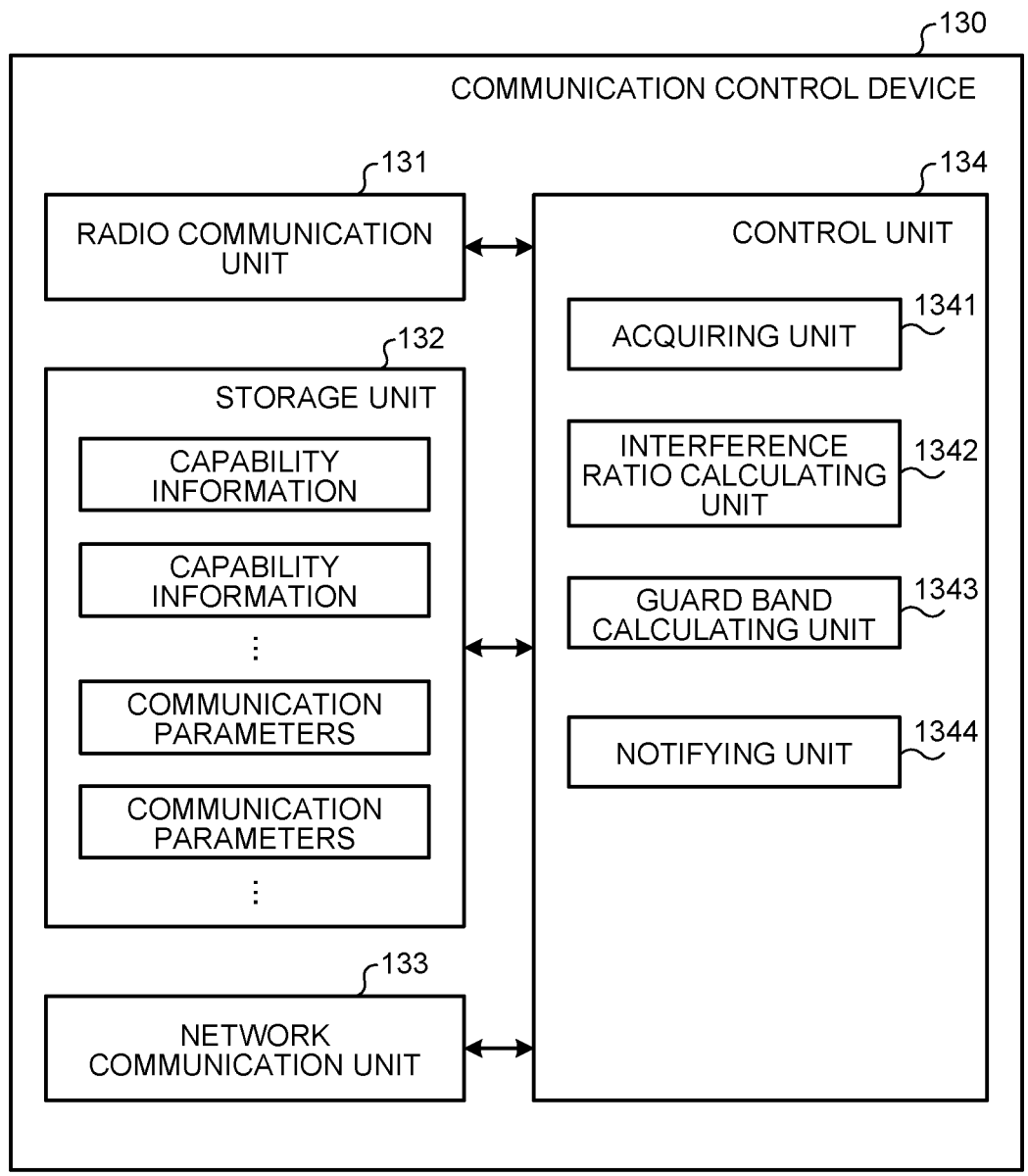

FIG.11

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

FIG.12

| SCS (kHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |

FIG.13

| SCS (kHz) | 100 MHz | 200 MHz | 400 MHz |
|---|---|---|---|
| 240 | 3800 | 7720 | 15560 |

— TRANSMISSION CHARACTERISTIC OF SECONDARY SYSTEM
- - - RECEPTION CHARACTERISTIC OF PRIMARY SYSTEM

— TRANSMISSION CHARACTERISTIC OF SECONDARY SYSTEM
- - - RECEPTION CHARACTERISTIC OF PRIMARY SYSTEM

US 12,452,116 B2

COMMUNICATION CONTROL DEVICE AND COMMUNICATION CONTROL METHOD

CROSS REFERENCE TO RELATED APPLICATIONS

This application is a U.S. National Phase of International Patent Application No. PCT/JP2021/029744 filed on Aug. 12, 2021, which claims priority benefit of Japanese Patent Application No. JP 2020-139376 filed in the Japan Patent Office on Aug. 20, 2020. Each of the above-referenced applications is hereby incorporated herein by reference in its entirety.

FIELD

The present disclosure relates to a communication control device and a communication control method.

BACKGROUND

In recent years, a problem of exhaustion of radio wave resources (frequencies) that can be allocated to radio systems has emerged. Dynamic frequency sharing (DSA: Dynamic Spectrum Access) has been attracting attention as means for producing necessary radio wave resources.

CITATION LIST

Non Patent Literature

Non Patent Literature 1: CBRS Alliance "CBRSA-TS-2001" Feb. 1, 2018 "https://www.cbrsalliance.org/wp-content/uploads/2018/06/CBRSA-TS-2001-V1.0.0.pdf"
Non Patent Literature 2: WINNF, "WINNF-TS-0112", "https://winnf.memberclicks.net/assets/CBRS/WINNF-TS-0112.pdf"
Non Patent Literature 3: CEPT ECC, "ECC Report 186 Technical and operational requirements for the operation of white space devices under geo-location approach", January 2013, "https://www.ecodocdb.dk/download/124023a2-73ee/ECCREP186.PDF"
Non Patent Literature 4: The National Archives, "The Wireless Telegraphy (White Space Devices) (Exemption) Regulations 2015", http://www.legislation.gov.uk/uksi/2015/2066/contents/made
Non Patent Literature 5: WINNF, "WINNF-SSC-0010", https://winnf.memberclicks.net/assets/CBRS/WINNF-SSC-0010.pdf
Non Patent Literature 6: FCC (Federal Communications Commissions), "C.F.R (Code of Federal Regulations) Part 96", https://www.ecfr.gov/cgi-bin/retrieveECFR?gp=&SID=2dd346e3b51f2866ab6fb907e755526&mc=true&r=PART&n=pt47.5.96
Non Patent Literature 7: 3GPP (3rd Generation Partnership Project), "TS (Technical Specification) 36.104", "https://portal.3gpp.org/desktopmodules/Specifications/SpecificationDetails.aspx?specification Id=2412"
Non Patent Literature 8: 3GPP, "TS38.104", https://portal.3gpp.org/desktopmodules/Specifications/SpecificationDetails.aspx?specification Id=3202
Non Patent Literature 9: ETSI (European Telecommunications Standards Institute), "EN 301 598", httph://www.etsi.org/deliver/etsi_en/301500_301599/301598/01.01.01_60/en_301598v010101p.pdf
Non Patent Literature 10: ITU-R P.452-16, "Prediction procedure for the evaluation of microwave interference between stations on the surface of the Earth at frequencies above about 0.7 GHz", https://www.itu.int/dms_pubrec/itu-r/rec/p/R-REC-P.452-16-201507-I!!PDF-E.pdf

SUMMARY

Technical Problem

Here, in a CBRS (Citizens Broadband Radio Service) in which a three-layer hierarchical frequency shared architecture is defined, an upper layer protection rule related to co-channel interference is defined. An SAS (Spectrum Access System) has to observe these rules. On the other hand, it is not requested as a rule for the SAS to reduce interference that occurs in the same layer, in particular, in GAA-GAA. About PA-PA, although there is a protection rule concerning co-channel interference, adjacent channel interference is not cared for. Further, adjacent channel interference is not cared for about PA protection against given interference from GAA.

Therefore, the present disclosure proposes a communication control device and a communication control method capable of appropriately setting a guard band for the purpose of upper layer protection and network coexistence that consider adjacent channel interference.

Solution to Problem

In order to solve the above problem, a communication control device according to an aspect of the present disclosure includes: an interference ratio calculating unit that calculates an adjacent channel interference ratio between a first radio system, which is a protection target, and a second radio system, which is an interference source, when a part or all of a frequency band used by the first radio system is shared and used by the second radio system; and a guard band calculating unit that calculates, based on the adjacent channel interference ratio, a guard band necessary for a channel of the first radio system or the second radio system.

BRIEF DESCRIPTION OF DRAWINGS

FIG. 9 is a diagram illustrating a configuration example of a communication control device according to the embodiment of the present disclosure.

FIG. 10 is a diagram cited from Table 5.6-1 of TS 36.104 of 3GPP and is a diagram concerning Transmission bandwidth configuration NRB in E-UTRA channel bandwidth.

FIG. 11 is a diagram cited from Table 5.3.3-1 in TS 38.104 of 3GPP and is a diagram concerning Minimum guardband (kHz) (FR1).

FIG. 12 is a diagram cited from Table 5.3.3-2 in TS 38.104 of 3GPP and is a diagram concerning Minimum guardband (kHz) (FR2).

FIG. 13 is a diagram cited from TS 38.104 Table 5.3.3-3 of 3GPP and is a diagram concerning Minimum guardband (kHz) of SCS 240 kHz SS/PBCH block (FR2).

DESCRIPTION OF EMBODIMENTS

Figure 1:
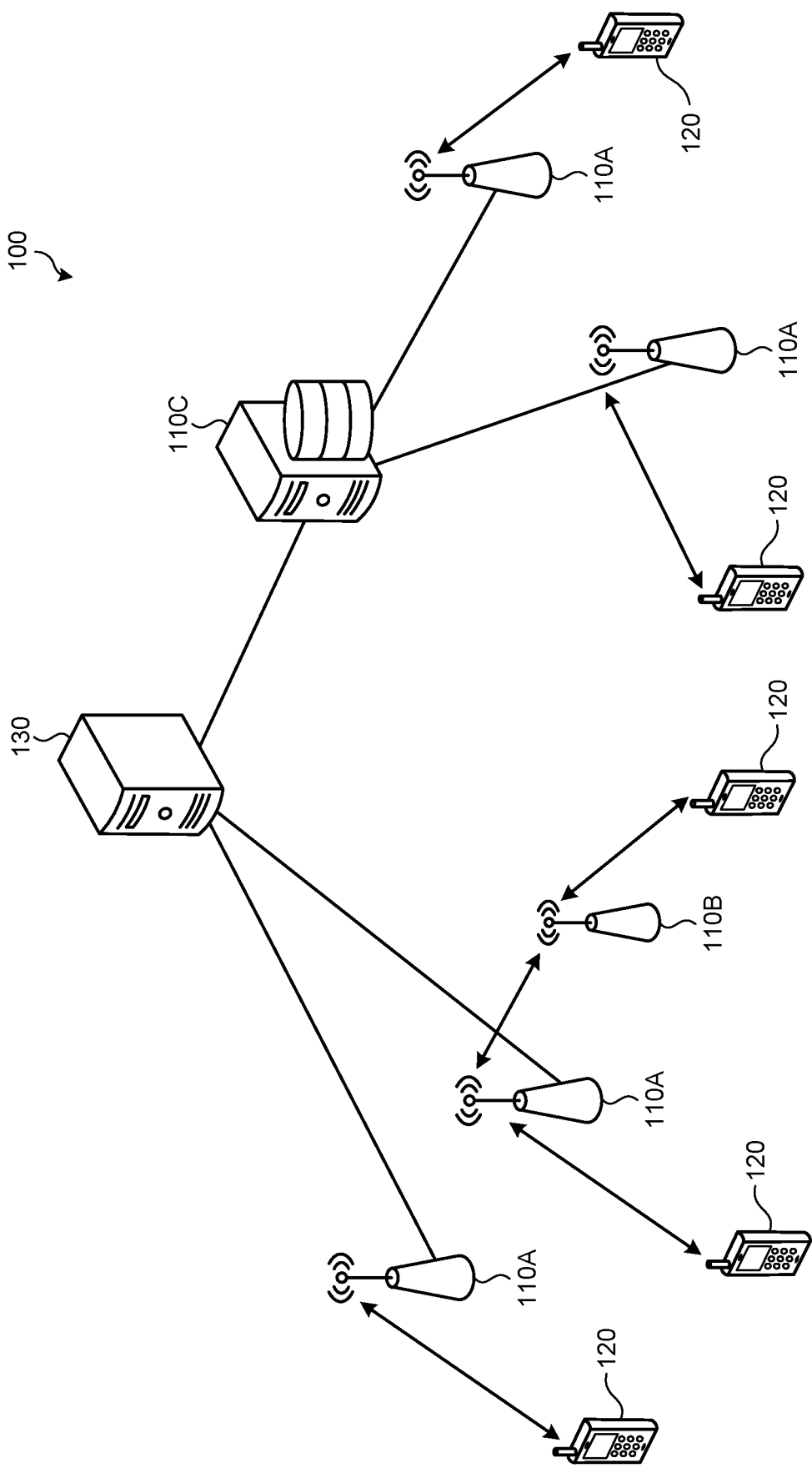
FIG. 1 is a diagram illustrating a configuration example of a communication network system.

An embodiment of the present disclosure is explained in detail below with reference to the drawings. Note that, in the embodiment explained below, redundant explanation is omitted by denoting the same parts with the same reference numerals and signs.

The present disclosure is explained according to the following item order.
1. Introduction
1-1. Control of a Radio System for Frequency Sharing Realization
1-2. Terms of Concerning Frequencies and Sharing
2. Configuration of a Communication Network System
2-1. Configuration of a Terminal Device
2-2. Configuration of a Communication Device
2-3. Configuration of an Intermediate Device
2-4. Configuration of a Communication Control Device
3. Explanation of Procedures Assumed in the Present Embodiment
3-1. Registration Procedure
3-1-1. Details of Required Parameters
3-1-1-1. Supplement to Required Parameters
3-1-2. Details of Registration Processing
3-2. Available Frequency Information Inquiry Procedure
3-2-1. Details of Required Parameters
3-2-2. Details of Available Frequency Evaluation Processing
3-3. Frequency Use Permission Procedure
3-3-1. Details of Frequency Use Permission Processing
3-4. Frequency Use Notification
3-5. Supplement to Procedures
3-6. Procedures Concerning a Terminal
3-7. Procedures that Take Place Between Communication Control Devices
3-7-1. Information Exchange
3-7-2. Instructions and Request Procedures
3-8. Information Transmission Means
3-8-1. Signaling Between a Communication Control Device and a Communication Device
3-8-2. Signaling Between a Communication Device and a Terminal Device
3-8-3. Terminal-to-Terminal Signaling
4. Operation According to the Present Embodiment
5. Modifications
6. Conclusion

1. INTRODUCTION

Because of a radio environment in which various radio systems are mixed and an increase and diversification of a content amount via radio in recent years, a problem in that radio wave resources (for example, frequencies) that can be allocated to the radio systems are exhausted has emerged. However, since all radio wave bands are already used by existing radio systems, it is difficult to allocate new radio wave resources. Therefore, in recent years, more effective use of radio wave resources by utilization of a cognitive radio technology has started to attract attention.

In the cognitive radio technology, radio wave resources are produced by utilizing (for example, performing dynamic frequency sharing (DSA: Dynamic Spectrum Access) of) temporally and spatially unused radio waves (White Space) of the existing radio systems. For example, in the United States, with the aim of opening a Federal use band (3.55 to 3.70 GHz), which overlaps frequency bands that are 3GPP bands 42 and 43 worldwide, to the general public, legalization and standardization of a CBRS (Citizens Broadband Radio Service) for utilizing a frequency sharing technology are accelerating.

Note that the cognitive radio technology contributes not only to dynamic frequency sharing but also to improvement in frequency use efficiency by the radio systems. For example, in ETSI EN 303 387 and IEEE 802.19.1-2014, a technology of coexistence between radio systems that use unused radio waves is specified.

1-1. Control of a Radio System for Frequency Sharing Realization

In general, in the frequency sharing, the National Regulatory Authorities (NRAs) of countries/regions require to protect a radio system (a primary system) of a primary user who is licensed or authorized for use of a frequency band. Typically, an allowable interference reference value of the primary system is provided by the NRAs. A radio system (a secondary system) of a secondary user is requested to reduce given interference caused by sharing to be less than the allowable interference reference value.

Note that, in the following explanation, a "system" means a set of a plurality of components (devices, modules (parts), and the like). At this time, it does not matter whether all the components are present in the same housing. For example, both of a plurality of devices housed in separate housings and connected via a network or the like and one device in which a plurality of modules are housed in one housing are "systems". That is, each of the radio systems such as the primary system and the secondary system may be configured by a plurality of devices or may be configured by one device.

In order to realize frequency sharing, for example, a communication control device (for example, a frequency management database) controls communication of the secondary system not to give fatal interference to the primary system. The communication control device is a device that manages communication and the like of the communication device. For example, the communication control device is a system for managing radio wave resources (for example, frequencies) such as a GLDB (Geo-location Database) or an SAS (Spectrum Access System). In the case of the present embodiment, the communication control device is equivalent to a communication control device 130 explained below. The communication control device 130 is explained in detail below.

Here, the primary system is, for example, a system (for example, an existing system) that preferentially uses a predetermined frequency band over other systems. The secondary system is, for example, a system that secondarily uses (for example, performs dynamic frequency sharing of) a frequency band used by the primary system. Each of the primary system and the secondary system may be configured by a plurality of communication devices or may be configured by one communication device. In the following explanation, the communication control device distributes an interference allowable amount to one or a plurality of communication devices such that accumulation of interference (Interference Aggregation) of one or a plurality of communication devices configuring the secondary system to the primary system does not exceed an interference allowable amount (referred to as interference margin as well) of the primary system. At this time, the interference allowable amount may be an interference amount determined in advance by an operator of the primary system, a public organization that manages radio waves, or the like. In the following explanation, an interference margin indicates an interference allowable amount. Accumulation of interference is sometimes called cumulative given interference power.

The system model is represented by a communication network system 100 including radio communication as illustrated in FIG. 1 and is typically configured by the following entities. FIG. 1 is a diagram illustrating a configuration example of a communication network system 100.

Communication device 110
Terminal device 120
Communication control device 130

This system model also includes at least a primary system and a secondary system that use the communication network system 100. The primary system and the secondary system are configured by a communication device 110 or the communication device 110 and a terminal device 120. Although various communication systems can be treated as the primary system or the secondary system, in the present embodiment, the primary system is a radio system that uses a specific frequency band and the secondary system is a radio system that shares a part or the entire frequency band. That is, this system model is explained as a model of a radio communication system concerning dynamic frequency sharing (DSA: Dynamic Spectrum Access). Note that this system model is not limited to a system related to dynamic frequency sharing.

Typically, the communication device 110 is a radio device that provides a radio communication service to the terminal device 120 such as a radio base station (Base Station, Node B, eNB, gNB, or the like) or a radio access point. That is, the communication device 110 provides a radio communication service to enable radio communication of the terminal device 120. The communication device 110 may be a radio relay device or an optical extension device called Remote Radio Head (RRH). In the following explanation, unless noted otherwise, the communication device 110 is explained as an entity configuring the secondary system.

A coverage (a communication area) provided by the communication device 110 is allowed to have various sizes from a large size such as a macro cell to a small size such as a pico cell. Like a distributed antenna system (DAS), a plurality of communication devices 110 may form one cell. When the communication device 110 has a beamforming capability, a cell or a service area may be formed for each beam.

In the present disclosure, it is assumed that two different types are present as the communication devices 110. Specifically, as illustrated in FIG. 1, it is assumed that a "communication device 110A" and a "communication device 110B" are present.

In the present disclosure, the communication device 110 that can access the communication control device 130 without using a radio path requiring permission of the communication control device 130 is referred to as "communication device 110A". Specifically, for example, the communication device 110 capable of performing Internet connection by wire can be regarded as the "communication device 110A. For example, even a radio relay device not having an Internet connection function by wire may be regarded as the "communication device 110A" if a radio backhaul link using a frequency not requiring permission of the communication control device 130 is constructed between the radio relay device and another communication device 110A.

In the present disclosure, the communication device 110 that cannot access the communication control device 130 without a radio path requiring permission of the communication control device 130 is referred to as "communication device 110B". For example, a radio relay device that needs to construct a backhaul link using a frequency requiring permission of the communication control device 130 can be regarded as the "communication device 110B". For example, a device such as a smartphone that has a radio network provision function represented by tethering and uses a frequency requiring permission of the communication control device 130 in both the backhaul link and the access link may be treated as the "communication device 110B".

The communication device 110 does not need to be fixedly installed. For example, the communication device 110 may be installed in a moving object such as an automobile. The communication device 110 does not always need to be present on the ground. The communication device 110 may be included in an object present in the air or the space such as an aircraft, a drone, a helicopter, an HAPS (High Altitude Platform Station), a balloon, or a satellite. The communication device 110 may be included in an object present on the sea or under the sea such as a ship or a submarine. Typically, such a mobile communication device 110 corresponds to the communication device 110B and performs radio communication with the communication device 110A to secure an access path to the communication control device 130. As a matter of course, even the mobile communication device 110 can be treated as the communication device 110A if a frequency used in the radio communication with the communication device 110A is not managed by the communication control device 130.

In the present disclosure, unless noted otherwise, the description "communication device 110" includes both meanings of the communication device 110A and the communication device 110B and may be replaced with either one.

The communication device 110 can be used, operated, or managed by various entities (operators). For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (educational institutions, boards of education of local governments, and the like), a real estate (building, apartment, and the like) administrator, an individual, and the like can be assumed as operators related to the communication device 110. Note that the operators related to the communication device 110 is not particularly limited. The communication device 110A may be a shared facility used by a plurality of operators. Operators that perform installation, use, operation, and management of facilities may be respectively different.

The communication device 110 operated by the operator is typically connected to the Internet via a core network. Operation, management, and maintenance are performed by a function called OA & M (Operation, Administration & Maintenance). For example, as illustrated in FIG. 1, an intermediate device (a network manager) 110C that integrally controls the communication device 110 in the network can be present. Note that the intermediate device 110C sometime can be the communication device 110 or sometimes can be the communication control device 130.

The terminal device 120 (referred to as User Equipment, User Terminal, User Station, Mobile Terminal, Mobile Station, and the like as well) is a device that performs radio communication with a radio communication service provided by the communication device 110. Typically, communication equipment such as a smartphone corresponds to the terminal device 120. Note that a device having a radio communication function can correspond to the terminal device 120. For example, equipment such as a camera for business use having a radio communication function can also correspond to the terminal device 120 even if radio communication is not a main use. Communication equipment that transmits data to the terminal device 120 such as a radio station for broadcasting business (FPU: Field Pickup Unit) that transmits an image for television broadcast or the like from the outside of a broadcasting station (a site) to the broadcasting station in order to perform sports broadcast or the like also corresponds to the terminal device 120. The terminal device 120 does not always need to be used by a person. For example, as in so-called MTC (Machine Type Communication), equipment such as a machine in a factory or a sensor installed in a building may be network-connected and operate as the terminal device 120. Equipment called customer premises equipment (CPE) provided in order to secure Internet connection may behave as the terminal device 120.

As represented by D2D (Device-to-Device) and V2X (Vehicle-to-Everything), a relay communication function may be included in the terminal device 120.

Like the communication device 110, the terminal device 120 does not need to be fixedly installed or does not need to be present on the ground. An object present in the air or the space such as an aircraft, a drone, a helicopter, a satellite, or the like may operate as the terminal device 120. An object present on the sea or in the sea such as a ship or a submarine may operate as the terminal device 120.

In the present disclosure, unless noted otherwise, the terminal device 120 corresponds to an entity in which a radio link using a frequency requiring permission of the communication control device 130 is terminated. However, depending on a function of the terminal device 120 and an applied network topology, the terminal device 120 can operate equivalently to the communication device 110. In other words, depending on the network topology, a device that can correspond to the communication device 110 such as a radio access point sometimes corresponds to the terminal device 120 or a device that can correspond to the terminal device 120 such as a smartphone sometimes corresponds to the communication device 110.

The communication control device 130 is typically a device that performs determination, permission to use, instruction, and/or management of communication parameters of the communication device 110. For example, a database server called TVWSDB (TV White Space Database), GLDB (Geolocation Database), SAS (Spectrum Access System), or AFC (Automated Frequency Coordination) corresponds to the communication control device 130. A control device that performs radio wave interference control between devices defined by a standard represented by, for example, EN 303 387 of ETSI (European Telecommunications Standards Institute), IEEE (Institute of Electrical and Electronics Engineers) 802.19.1-2018, or CBRSA-TS-2001 also corresponds to the communication control device 130. For example, a Registered Location Secure Server (RLSS) defined in IEEE 802.11-2016 also corresponds to the communication control device 130. That is, without being limited to these examples, an entity responsible for determination, permission to use, instruction, management, and the like of the communication parameters of the communication device 110 may be referred to as the communication control device 130. Basically, a control target of the communication control device 130 is the communication device 110. However, the communication control device 130 may control the terminal device 120 under the control of the communication device 110.

A plurality of communication control devices 130 may be present. When a plurality of communication control devices 130 are present, at least one of the following three types of decision-making topologies can be applied to the communication control device 130.

Figure 2:
FIG. 2 is a diagram illustrating a case in which a plurality of communication control devices are disposed in a distributed manner.

Autonomous Decision-Making
Centralized Decision-Making
Distributed Decision-Making The Autonomous Decision-Making means a decision-making topology in which an entity (a decision-making entity, here the communication control device 130), which makes a decision, makes a decision independently from another decision-making entity. The communication control device 130 independently calculates necessary frequency allocation and interference control. For example, when a plurality of communication control devices 130 are disposed in a distributed manner as illustrated in FIG. 2, the autonomous decision-making can be applied. FIG. 2 is a diagram illustrating a case in which a plurality of communication control devices 130 are disposed in a distributed manner.

Figure 3:
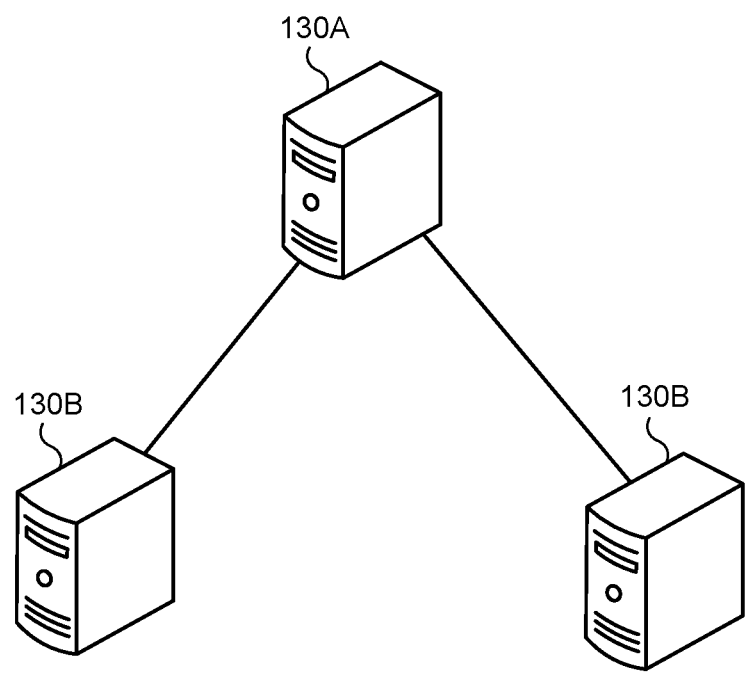
FIG. 3 is a diagram illustrating a model in which one communication control device centrally controls a plurality of communication control devices.

The centralized decision-making is a decision-making topology in which a decision-making entity delegates decision-making to another decision-making entity. When the centralized decision-making is implemented, for example, a model illustrated in FIG. 3 is assumed. FIG. 3 illustrates a model (a so-called master-slave type) in which one communication control device 130A centrally controls a plurality of communication control devices 130B. In the model illustrated FIG. 3, the communication control device 130A, which is a master, can control the communication control devices 130B, which are a plurality of slaves, to intensively make decisions.

The distributed decision-making is a decision-making topology in which a decision-making entity makes a decision in cooperation with another decision-making entity. For example, although a plurality of communication control devices 130 independently make a decision as in autonomous decision-making illustrated in FIG. 2, the respective communication control devices 130 performing mutual adjustment of decision-making results, negotiation, and the like after making a decision can correspond to the "distributed decision-making". Further, for example, in the centralized decision-making illustrated in FIG. 3, for the purpose of load balancing or the like, the master communication control device 130A dynamically implementing delegation or discarding of a decision-making authority to the slave communication control devices 130B can also be regarded as the "distributed decision-making".

Figure 4:
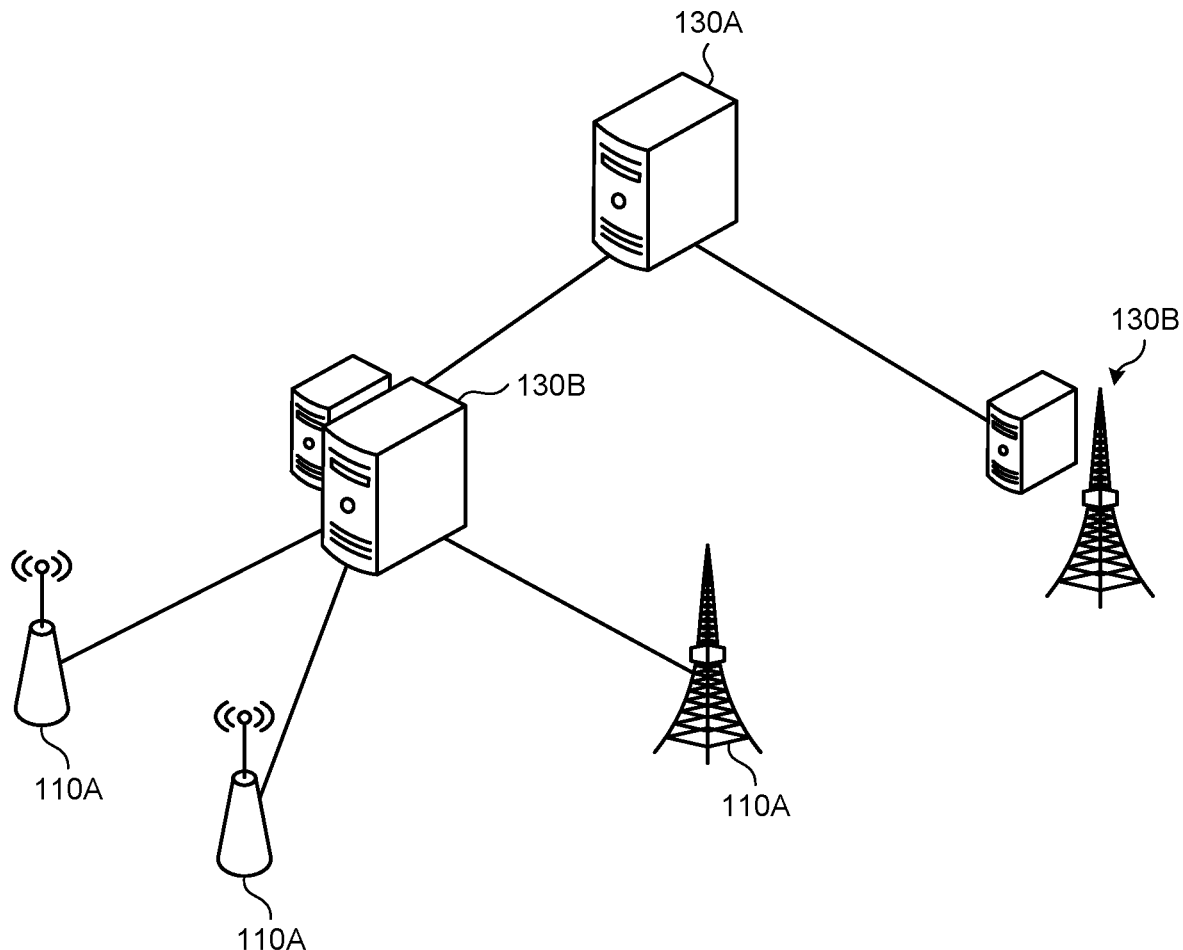
FIG. 4 is a diagram illustrating an example in which a slave communication control device operates as an intermediate device that manages a plurality of communication devices.

Both of the centralized decision-making and the distributed decision-making are sometimes applied. FIG. 4 is a diagram illustrating an example in which the slave communication control device 130B operates as an intermediate device that manages a plurality of communication devices 110A. The master communication control device 130A may not manage the communication devices 110 controlled by the slave communication control device 130B, that is, the secondary system configured by the slave communication control device 130B.

The communication control device 130 can acquire, for the role, necessary information from entities other than the communication device 110 and the terminal device 120 of the communication network system 100 as well. Specifically, for example, the communication control device 130 can acquire information necessary for protecting the primary system from a database (a regulatory database) managed or operated by the national regulatory authority (NRA) of a country or a region. Examples of the regulatory database include the ULS (Universal Licensing System) operated by the Federal Communications Commission (FCC). Examples of information necessary for protecting the primary system include position information of the primary system, communication parameters of the primary system, an out-of-band emission (OOBE) limit, an adjacent channel leakage ratio (ACLR), adjacent channel selectivity, a fading margin, and a protection ratio (PR). In an area where fixed numerical values, an acquisition method, a derivation method, and the like are defined by a law or the like in order to protect the primary system, it is desirable to use information defined by the law as information necessary for protecting the primary system.

A database that records the communication device 110 and the terminal device 120 that have received conformity authentication such as an equipment authorization system (EAS) managed by an OET (Office of Engineering and Technology) of the FCC also corresponds to the regulatory database. From such a regulatory database, information concerning an operable frequency of the communication device 110 and the terminal device 120, information concerning the maximum EIRP, and the like can be acquired. Naturally, the communication control device 130 may use these kinds of information for protecting the primary system.

Further, it is also assumed that the communication control device 130 acquires radio wave sensing information from a radio wave sensing system installed and operated for the purpose of radio wave detection in the primary system. As a specific example, in a CBRS (Citizens Broadband Radio Service) of the United States, the communication control device 130 acquires radio wave detection information of a marine radar, which is the primary system, from a radio wave sensing system called environmental sensing capability (ESC). When the communication device 110 and the terminal device 120 have a sensing function, the communication control device 130 may acquire radio wave detection information of the primary system from these devices.

An interface among the entities configuring this system model may be either wired or wireless. For example, not only a wired line but also a radio interface that does not depend on frequency sharing may be used as an interface between the communication control device 130 and the communication device 110. As the radio interface that does not depend on frequency sharing, there are a radio communication line provided by a mobile communication carrier via a licensed band and Wi-Fi communication using an existing license-exempt band.

1-2. Terms Related to Frequencies and Sharing

As explained above, the present embodiment is explained assuming a dynamic frequency sharing (Dynamic Spectrum Access) environment. As a representative example of the dynamic frequency sharing, a mechanism defined by CBRS of the United States (that is, a mechanism defined in the FCC Rules Part 96 Citizens Broadband Radio Service of the United States) is explained.

Figure 5:
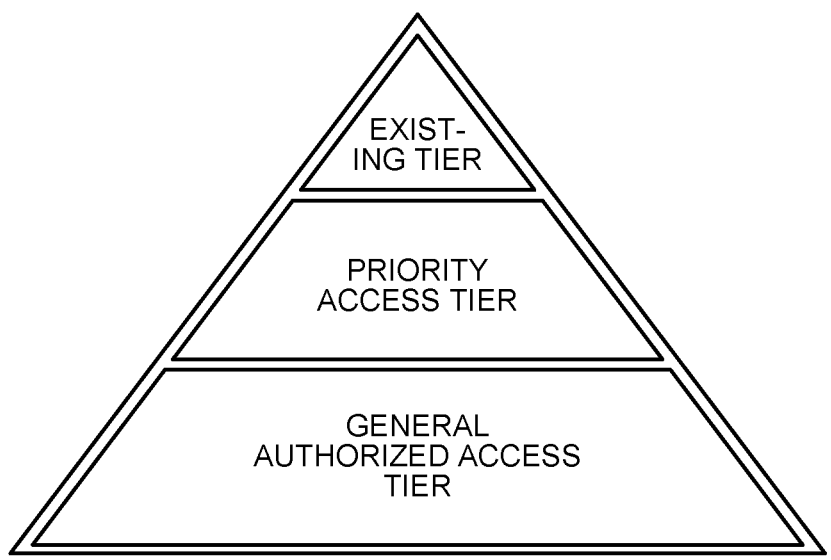
FIG. 5 is an explanatory diagram illustrating a hierarchical structure in CBRS.

In the CBRS, as illustrated in FIG. 5, each of users in the shared frequency band is classified into any one of three groups. FIG. 5 is an explanatory diagram illustrating a hierarchical structure in the CBRS. This group is called tier. The three groups are respectively called incumbent tier, priority access tier, and general authorized access (GAA) tier.

The incumbent tier is a group including existing users who conventionally use a frequency band defined as a shared frequency band. The existing user is generally called primary user as well. In the CBRS, the Department of Defense (DOD), fixed satellite operators, and new rule excepted radio broadband licensees (GWBL: Grandfathered wireless Broadband Licensee) of the United States are defined as existing users. The incumbent tier is not required to avoid interference with the priority access tier and the GAA tier having lower priority levels or to suppress utilization of a shared frequency band. The Incumbent tier is protected from interference by the priority access tier and the GAA tier. That is, a user of the incumbent tier can use the shared frequency band without considering the presence of other groups.

The priority access tier is a group including users who use the shared frequency band based on the PAL (Priority Access License). A user of the priority access tier is generally called secondary user as well. When the shared frequency band is used, for the incumbent tier having a higher priority level than the priority access tier, the priority access tier is required to perform both of interference avoidance and suppression of the use of the shared frequency band. On the other hand, for the GAA tier having a lower priority than the priority access layer, the priority access tire is requested to perform neither the interference avoidance nor the suppression of the use of the shared frequency band. In addition, the priority access tier is not protected from interference by the incumbent tier with a higher priority level but is protected from interference by the GAA tier having a lower priority level.

The GAA tier is a group including shared frequency band users who do not belong to the incumbent tier and the priority access tier. Simultaneously with the priority access tier, in general, a user of the GAA tier is also called secondary user. However, since the priority level of shared use is lower than that of the priority access tier, the user of the GAA tier is called low priority secondary user as well. When the shared frequency band is used, for the incumbent tier and the priority access tier having higher priority levels, the GAA tier is requested to perform interference avoidance and suppression of the use of the shared frequency band. The GAA tier is not protected from interference by the incumbent tier and the priority access tiers having higher priority levels. That is, the GAA tier is a tier that is requested to use an opportunistic shared frequency band under the law.

The mechanism of the CBRS is explained above as a representative example of the dynamic frequency sharing. However, the present embodiment is not limited to the definition of the CBRS. For example, as illustrated in FIG. 5, the CBRS generally adopts a three-tier structure. However, a two-tier structure may be adopted in the present embodiment. Representative examples of the two-tier structure include authorized shared access (ASA), licensed shared access (LSA), evolved LSA (eLSA), TV band white space (TVWS), and US 6 GHz band sharing. In the ASA, the LSA, and the eLSA, the GAA tier is absent and a structure equivalent to a combination of the incumbent tier and the priority access tier is adopted. In the TVWS and the US 6 GHz band shared, the priority access tier is absent and a structure equivalent to a combination of the incumbent tier and the GAA tier is adopted. Four or more tiers may be present. Specifically, for example, four or more tiers may be generated by providing a plurality of intermediate layers equivalent to the priority access tiers and giving different priority levels to the intermediate layers. For example, tiers may be increased by dividing the GAA tier and giving priority levels in the same manner. That is, the groups may be divided.

The primary system in the present embodiment is not limited to the definition of the CBRS. For example, as an example of the primary system, a radio system such as TV broadcasting, a fixed microwave line (FS: Fixed System), a meteorological radar, a radio altimeter, a radio train control system (Communication-based Train Control), or radio astronomy is assumed. Not only these systems but also all radio systems can be the primary system of the present embodiment.

As explained above, the present embodiment is not limited to be under the environment of frequency sharing. In general, in frequency sharing or frequency secondary utilization, an existing system that uses a target frequency band is called primary system and a secondary user is called secondary system. However, when the present embodiment is applied to an environment other than a frequency sharing environment, the systems should be read by replacing the systems with other terms. For example, a macro cell base station in a heterogeneous network (HetNet) may be the primary system and a small cell base station or a relay station in the heterogeneous network may be the secondary system. The base station may be the primary system, and a relay user equipment (UE) or a vehicle UE that realizes D2D or V2X present in a coverage of the base station may be the secondary system. The base station is not limited to a fixed type and may be a portable type or a mobile type. In such a case, for example, the communication control device 130 of the present embodiment may be included in a core network, a base station, a relay station, a relay UE, or the like.

When the present embodiment is applied to an environment other than the frequency shared environment, the term "frequency" in the present disclosure is replaced with another term shared by the application destination. For example, the term is assumed to be replaced with terms such as "resource", "resource block", "resource element", "resource pool", "channel", "component carrier", "carrier", "subcarrier", and "Bandwidth Part (BWP)" or other terms having meanings equivalent or similar thereto.

In the following explanation, configurations of the devices included in the communication network system 100 and an external device are specifically explained.

2. CONFIGURATION OF THE COMMUNICATION NETWORK SYSTEM

2-1. Configuration of the Terminal Device

Figure 6:
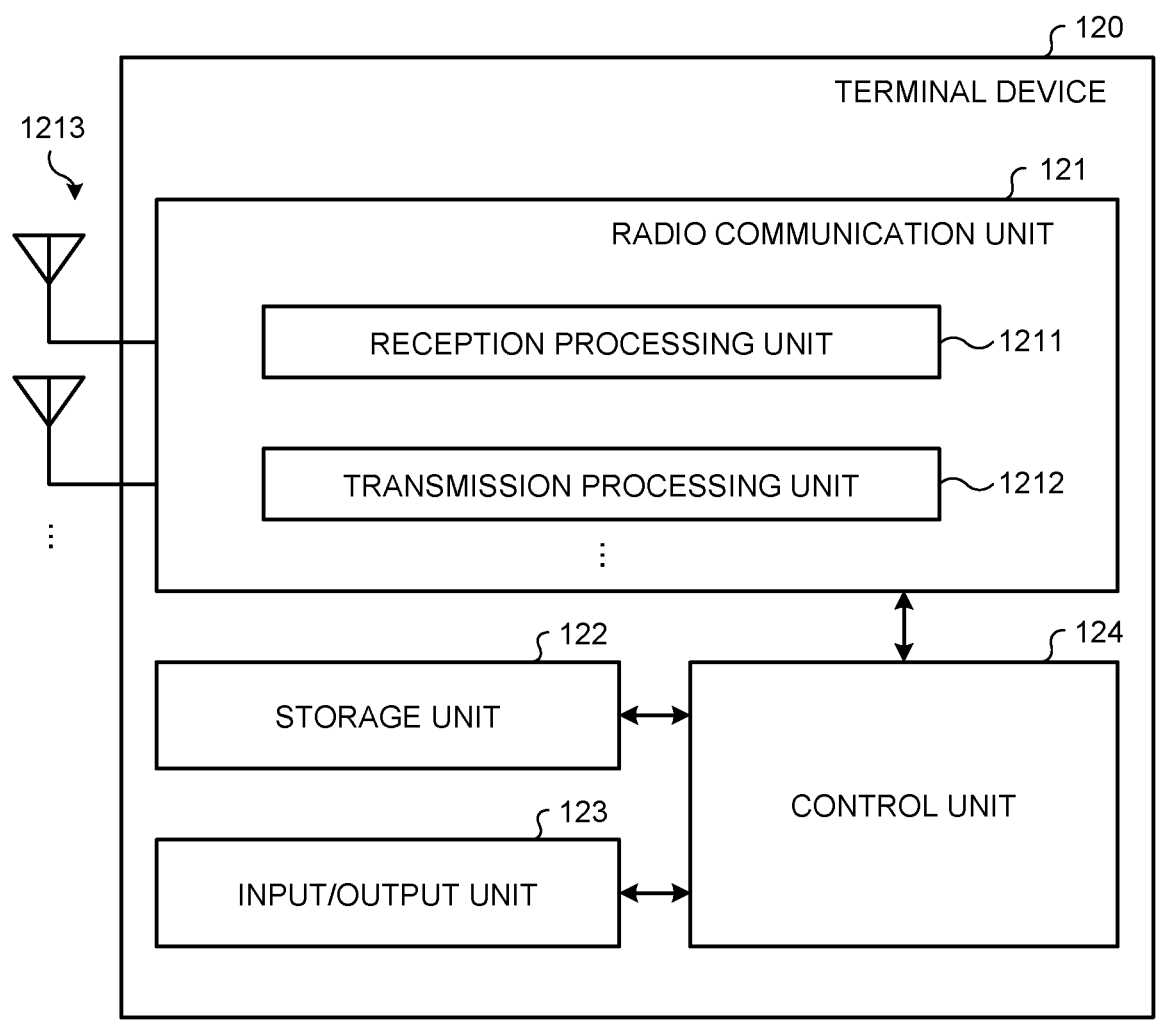
FIG. 6 is a diagram illustrating a configuration example of a terminal device according to an embodiment of the present disclosure.

Subsequently, a configuration of the terminal device 120 is explained. FIG. 6 is a diagram illustrating a configuration example of the terminal device 120 according to the embodiment of the present disclosure. The terminal device 120 is a communication device (a radio system) that wirelessly communicates with the communication device 110 and/or the communication control device 130. The terminal device 120 is a type of an information processing device.

The terminal device 120 includes a radio communication unit 121, a storage unit 122, an input/output unit 123, and a control unit 124. Note that the configuration illustrated in FIG. 6 is a functional configuration. A hardware configuration may be different from this configuration. The functions of the terminal device 120 may be implemented in a distributed manner in a plurality of physically separated components.

The radio communication unit 121 is a radio communication interface that wirelessly communicates with other communication devices (for example, the communication device 110 and the other terminal devices 120). The radio communication unit 121 operates under the control of the control unit 124. The radio communication unit 121 is adapted to one or a plurality of radio access schemes. For example, the radio communication unit 121 is adapted to both of NR and LTE. The radio communication unit 121 may be adapted to other radio access schemes such as W-CDMA and cdma 2000.

The radio communication unit 121 includes a reception processing unit 1211, a transmission processing unit 1212, and an antenna 1213. The radio communication unit 121 may include a plurality of reception processing units 1211, a plurality of transmission processing units 1212, and a plurality of antennas 1213. When the radio communication unit 121 is adapted to a plurality of radio access schemes, the units of the radio communication unit 121 can be configured separately for each of radio access schemes. For example, the reception processing unit 1211 and the transmission processing unit 1212 may be separately configured for the LTE and the NR. The configurations of the reception processing unit 1211 and the transmission processing unit 1212 are similar to the configurations of the reception processing unit 1111 and the transmission processing unit 1112 of the communication device 110.

The storage unit 122 is a data readable/writable storage device such as a DRAM (Dynamic Random Access Memory), an SRAM (Static Random Access Memory), a flash memory, or a hard disk. The storage unit 122 functions as storage means of the terminal device 120.

The input/output unit 123 is a user interface for exchanging information with the user. For example, the input/output unit 123 is an operation device for the user to perform various kinds of operation such as a keyboard, a mouse, an operation key, and a touch panel. Alternatively, the input/output unit 123 is a display device such as a liquid crystal display or an organic electroluminescence display. The input/output unit 123 may be an acoustic device such as a speaker or a buzzer. The input/output unit 123 may be a lighting device such as an LED (Light Emitting Diode) lamp. The input/output unit 123 functions as input/output means (input means, output means, operation means, or notification means) of the terminal device 120.

The control unit 124 is a controller that controls the units of the terminal device 120. The control unit 124 is realized by a processor such as a CPU (Central Processing Unit) or an MPU (Micro Processing Unit). For example, the control unit 124 is realized by the processor executing various programs stored in a storage device inside the terminal device 120 using a RAM (Random Access Memory) or the like as a work area. Note that the control unit 124 may be realized by an integrated circuit such as an ASIC (Application Specific Integrated Circuit) or an FPGA (Field Programmable Gate Array). All of the CPU, the MPU, the ASIC, and the FPGA can be regarded as the controller. Note that the control unit 124 may have the functional blocks included in the control unit of the communication device 110.

The control unit 124 may be indicated by functional blocks indicating functions executed by the control unit 124. The functional blocks may be software blocks or hardware blocks. For example, each the functional blocks may be one software module realized by software (including a micro programs) or may be one circuit block on a semiconductor chip (die). Naturally, each of a plurality of functional blocks may be one processor or one integrated circuit. A configuration method for the functional blocks is optional. Note that the control unit 124 can be configured by any functional unit.

2-2. Configuration of the Communication Device

Figure 7:
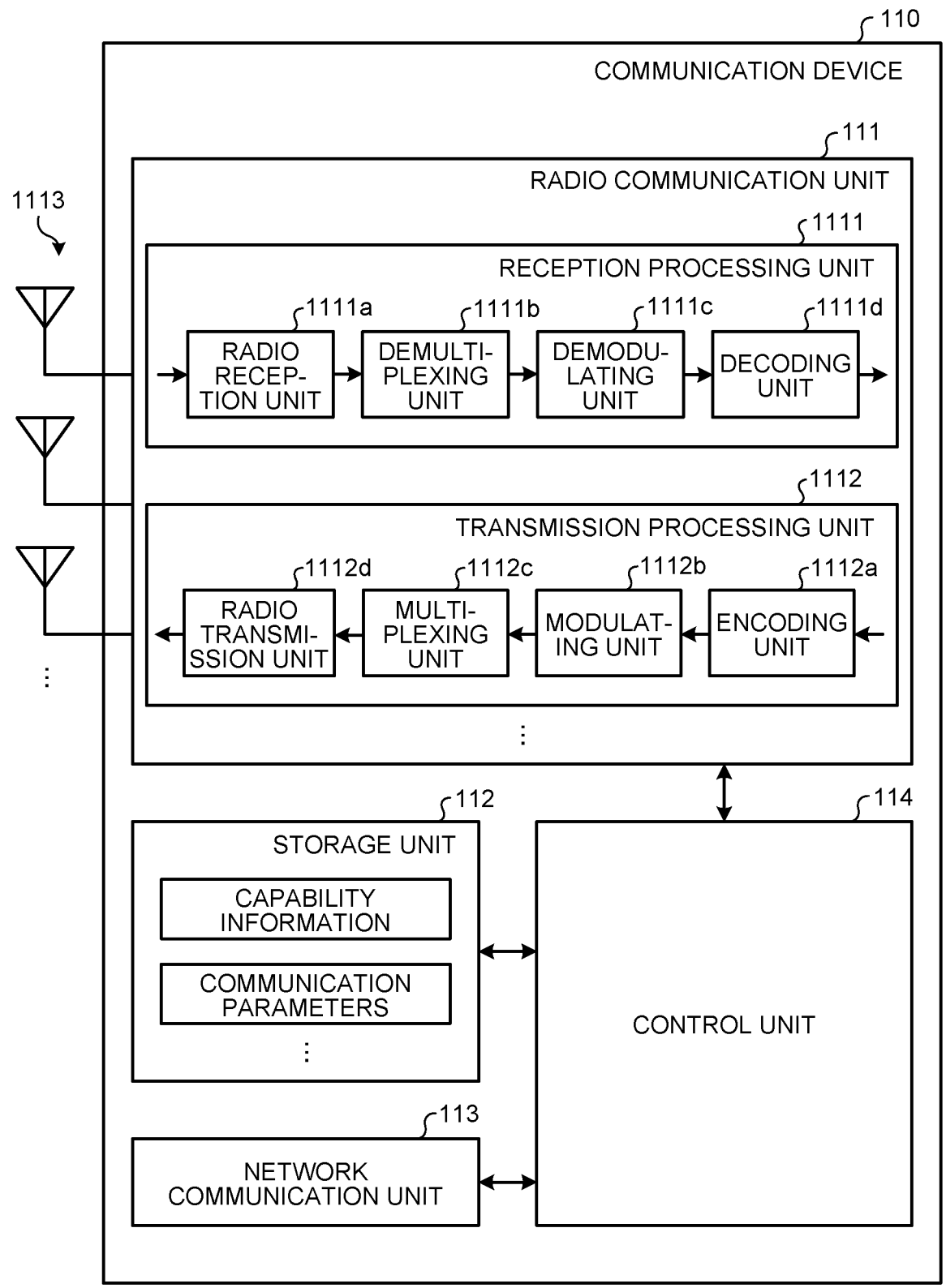
FIG. 7 is a diagram illustrating a configuration example of a communication device according to the embodiment of the present disclosure.

Subsequently, a configuration of the communication device 110 is explained. FIG. 7 is a diagram illustrating a configuration example of the communication device 110 according to the embodiment of the present disclosure. The communication device 110 is a communication device (a radio system) that wirelessly communicates with the terminal device 120 according to the control of the communication control device 130. The communication device 110 is a type of an information processing device.

The communication device 110 includes a radio communication unit 111, a storage unit 112, a network communication unit 113, and a control unit 114. Note that the configuration illustrated in FIG. 7 is a functional configuration. A hardware configuration may be different from this configuration. The functions of the communication device 110 may be implemented in a distributed manner in a plurality of physically separated devices.

The radio communication unit 111 is a radio communication interface that wirelessly communicates with other communication devices (for example, the terminal device 120, the communication control device 130, the intermediate device 110C, and the other communication devices 110).

The radio communication unit 111 operates according to the control of the control unit 114. The radio communication unit 111 may be adopted to a plurality of radio access schemes. For example, the radio communication unit 111 may be adapted to both of NR and LTE. The radio communication unit 111 may be adapted to other cellular communication schemes such as W-CDMA and cdma 2000. The radio communication unit 111 may be adapted to a wireless LAN communication scheme in addition to the cellular communication scheme. Naturally, the radio communication unit 111 may be adapted to only one radio access scheme.

The radio communication unit 111 includes a reception processing unit 1111, a transmission processing unit 1112, and an antenna 1113. The radio communication unit 111 may include a plurality of reception processing units 1111, a plurality of transmission processing units 1112, and a plurality of antennas 1113. Note that, when the radio communication unit 111 is adapted to a plurality of radio access schemes, the units of the radio communication unit 111 can be configured separately for each of the radio access schemes. For example, if the communication device 110 is adapted to the NR and the LTE, the reception processing unit 1111 and the transmission processing unit 1112 may be configured separately for the NR and the LTE.

The reception processing unit 1111 performs processing of an uplink signal received via the antenna 1113. The reception processing unit 1111 includes a radio reception unit 1111a, a demultiplexing unit 1111b, a demodulating unit 1111c, and a decoding unit 1111d.

The radio reception unit 1111a performs, on the uplink signal, down-conversion, removal of unnecessary frequency components, control of an amplification level, quadrature demodulation, conversion into a digital signal, removal of a guard interval, extraction of a frequency domain signal by fast Fourier transform, and the like. For example, it is assumed that a radio access scheme of the communication device 110 is a cellular communication scheme such as LTE. At this time, the demultiplexing unit 1111b separates an uplink channel such as a PUSCH (Physical Uplink Shared Channel) or a PUCCH (Physical Uplink Control Channel) and an uplink reference signal from a signal output from the radio reception unit 1111a. The demodulating unit 1111c performs, on a modulation symbol of the uplink channel, demodulation of a reception signal using a modulation scheme such as BPSK (Binary Phase Shift Keying) or QPSK (Quadrature Phase Shift Keying). A modulation scheme used by demodulating unit 1111c may be multi-value QAM such as 16QAM (Quadrature Amplitude Modulation), 64QAM, or 256QAM. The decoding unit 1111d performs decoding processing on a demodulated encoded bits of the uplink channel. Decoded uplink data and uplink control information are output to the control unit 114.

The transmission processing unit 1112 performs transmission processing for downlink control information and downlink data. The transmission processing unit 1112 includes an encoding unit 1112a, a modulating unit 1112b, a multiplexing unit 1112c, and a radio transmission unit 1112d.

The encoding unit 1112a encodes downlink control information and downlink data input from the control unit 114 using an encoding scheme such as block encoding, convolutional encoding, turbo encoding, or the like. The modulating unit 1112b modulates encoded bits output from encoding unit 1112a with a predetermined modulation scheme such as BPSK, QPSK, 16QAM, 64QAM, or 256QAM. The multiplexing unit 1112c multiplexes modulation symbols of channels and a downlink reference signal and arranges the multiplexed symbols and the downlink reference signal in a predetermined resource element. The radio transmission unit 1112d performs various kinds of signal processing on a signal from the multiplexing unit 1112c. For example, the radio transmission unit 1112d performs processing such as conversion into a time domain by fast Fourier transform, addition of a guard interval, generation of a baseband digital signal, conversion into an analog signal, quadrature modulation, up-convert, removal of extra frequency components, and power amplification. A signal generated by the transmission processing unit 1112 is transmitted from the antenna 1113.

The storage unit 112 is a storage device capable of reading and writing data such as a DRAM, an SRAM, a flash memory, or a hard disk. The storage unit 112 functions as storage means of the communication device 110. The storage unit 112 stores desired transmission power information, operation parameters, owned resource information, and the like.

The desired transmission power information is information concerning transmission power that the communication device 110 requests the communication control device 130 as information concerning transmission power necessary for transmission of radio waves.

The operation parameters are information (for example, setting information) concerning a radio wave transmission operation of the communication device 110. For example, the communication parameters are information concerning a maximum value (maximum allowable transmission power) of transmission power allowed for the communication device 110. Naturally, the operating parameters are not limited to the information concerning the maximum allowable transmission power.

The owned resource information is information concerning owning of radio resources of the communication device 110. For example, the owned resource information is information concerning radio resources currently usable by the communication device 110. For example, the owned resource information is information concerning an owned amount of an interference margin allocated to the communication device 110 from the communication control device 130. The information concerning the owned amount may be information in a resource block unit explained below. That is, the owned resource information may be information (for example, a resource block owned amount) concerning a resource block owned by the communication device 110.

The network communication unit 113 is a communication interface for communicating with other devices (for example, the communication control device 130, the intermediate device 110C, and the other communication devices 110). For example, the network communication unit 113 is a LAN (Local Area Network) interface such as a NIC (Network Interface Card). The network communication unit 113 may be a USB (Universal Serial Bus) interface including a USB host controller, a USB port, and the like. The network communication unit 113 may be a wired interface or a radio interface. The network communication unit 113 functions as network communication means of the communication device 110. The network communication unit 113 communicates with other devices according to the control of the control unit 114.

The control unit 114 is a controller that controls the units of the communication device 110. The control unit 114 is realized by a processor such as a CPU (Central Processing Unit) or an MPU (Micro Processing Unit). For example, the control unit 114 is realized by the processor executing various programs stored in a storage device inside the communication device 110 using a RAM (Random Access Memory) or the like as a work area. Note that the control unit 114 may be realized by an integrated circuit such as an ASIC (Application Specific Integrated Circuit) or an FPGA (Field Programmable Gate Array). All of the CPU, the MPU, the ASIC, and the FPGA can be regarded as the controller.

The control unit 114 may be indicated by functional blocks indicating the functions executed by the control unit 114. The functional blocks may be software blocks or hardware blocks. For example, each the functional blocks may be one software module realized by software (including a micro programs) or may be one circuit block on a semiconductor chip (die). Naturally, each of a plurality of functional blocks may be one processor or one integrated circuit. A configuration method for the functional blocks is optional. Note that the control unit 114 can be configured in any functional unit.

Note that the control unit 124 of the terminal device 120 explained above may have the functional blocks included in the control unit 114 of the communication device 110. In this case, the description of "communication device 110" appearing in the following explanation can be replaced with "terminal device 120" as appropriate. The description of "control unit 124" appearing in the following explanation can also be replaced with "control unit 114" as appropriate.

2-3. Configuration of the Intermediate Device

Figure 8:
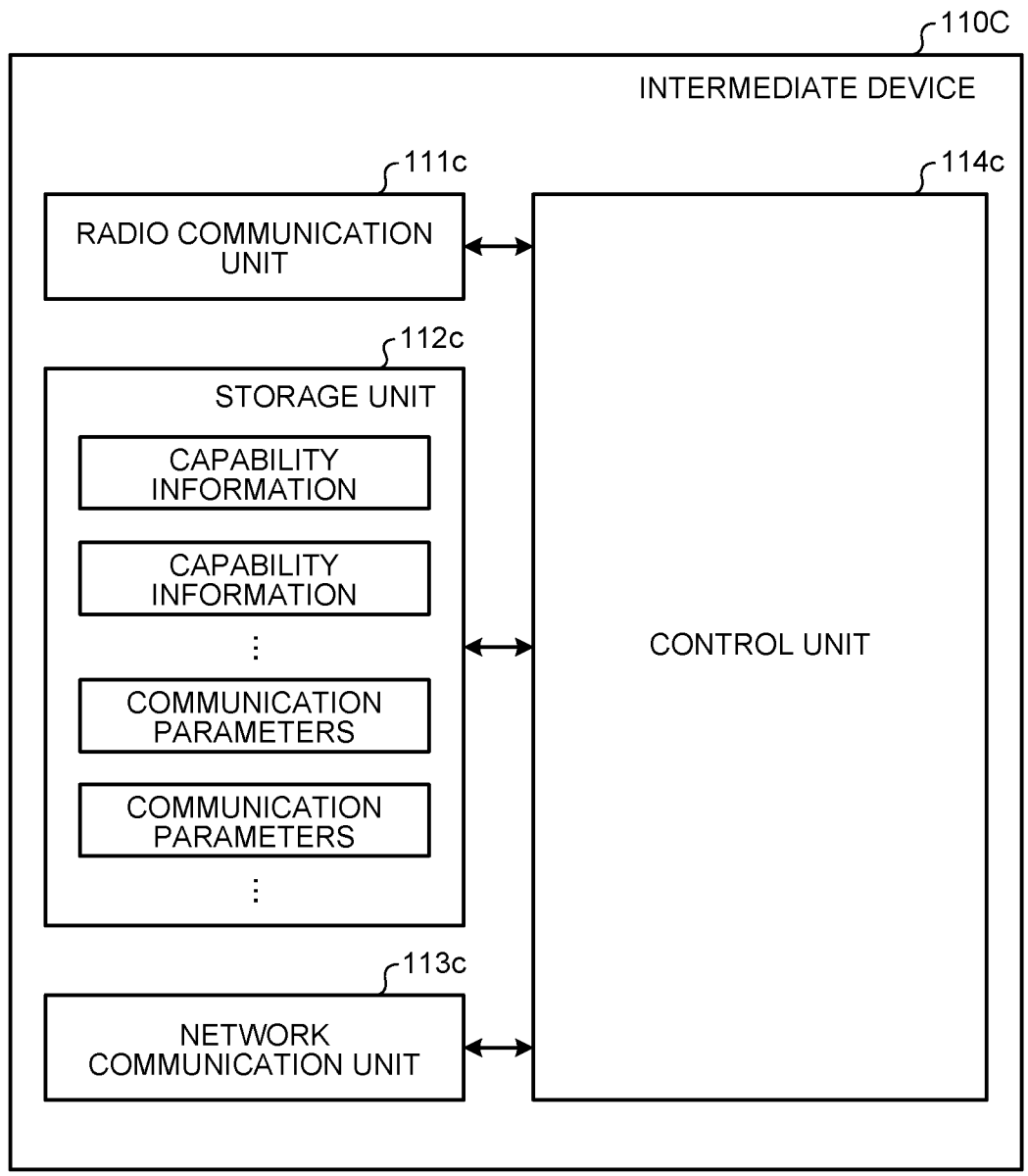
FIG. 8 is a diagram illustrating a configuration example of an intermediate device according to the embodiment of the present disclosure.

Subsequently, a configuration of the intermediate device 110C is explained. FIG. 8 is a diagram illustrating a configuration example of the intermediate device 110C according to the embodiment of the present disclosure. The intermediate device 110C is a communication device that communicates with the communication device 110 and the communication control device 130. The intermediate device 110C is a type of an information processing device.

The intermediate device 110C includes a radio communication unit 111c, a storage unit 112c, a network communication unit 113c, and a control unit 114c. Note that the configuration illustrated in FIG. 8 is a functional configuration. A hardware configuration may be different from this configuration. The functions of the intermediate device 110C may be implemented in a distributed manner in a plurality of physically separated components.

The radio communication unit 111c is a radio communication interface that wirelessly communicates with other communication devices (for example, the communication device 110, the terminal device 120, the communication control device 130, and the other intermediate device 110C). The radio communication unit 111c operates according to the control of the control unit 114c. The radio communication unit 111c is adapted to one or a plurality of radio access schemes. For example, the radio communication unit 111c is adapted to both of NR and LTE. The radio communication unit 111c may be adapted to other radio access schemes such as W-CDMA and cdma 2000. The configuration of the radio communication unit 111c is similar to the configuration of the radio communication unit 111c of the communication device 110.

The storage unit 112c is a storage device capable of reading and writing data such as a DRAM, an SRAM, a flash memory, or a hard disk. The storage unit 112c functions as storage means of the intermediate device 110C. The storage unit 112c may store specific information, communication parameters, and the like of each of the subordinate communication devices 110 (or the terminal device 120 further subordinate to the subordinate communication device 110).

The network communication unit 113c is a communication interface for communicating with other devices (for example, the communication device 110, the communication control device 130, and the other intermediate device 110C). For example, the network communication unit 113c is a LAN interface such as an NIC. The network communication unit 113c may be a USB interface configured by a USB host controller, a USB port, and the like. The network communication unit 113c may be a wired interface or a radio interface. The network communication unit 113c functions as network communication means of the intermediate device 110C. The network communication unit 113c communicates with other devices according to the control of the control unit 114c.

The control unit 114c is a controller that controls the units of the intermediate device 110C. The control unit 114c is realized by a processor such as a CPU or an MPU. For example, the control unit 114c is realized by the processor executing various programs stored in the storage device inside the intermediate device 110C using a RAM or the like as a work area. Note that the control unit 114c may be realized by an integrated circuit such as an ASIC or an FPGA. All of the CPU, the MPU, the ASIC, and the FPGA can be regarded as the controller.

The control unit 114c may be indicated by functional blocks indicating the functions executed by the control unit 114c. The functional blocks may be software blocks or hardware blocks. For example, each the functional blocks may be one software module realized by software (including a micro programs) or may be one circuit block on a semiconductor chip (die). Naturally, each of a plurality of functional blocks may be one processor or one integrated circuit. A configuration method for the functional blocks is optional. Note that the control unit 114c can be configured in any functional unit.

The operations of the functional blocks configuring the control unit 114c may be the same as the operations of the blocks configuring the control unit 114 of the communication device 110. In this case, the description of "intermediate device 110C" appearing in the following explanation can be replaced with "communication device 110" as appropriate. Similarly, the description of "control unit 114" appearing in the following explanation can be replaced with "control unit 114c" as appropriate.

2-4. Configuration of the Communication Control Device

The communication control device 130 is a device that controls radio communication of the communication device 110. The communication control device 130 may control radio communication of the terminal device 120 via the communication device 110 or directly. The communication control device 130 is a type of an information processing device.

FIG. 9 is a diagram illustrating a configuration example of the communication control device 130 according to the embodiment of the present disclosure. The communication control device 130 includes a radio communication unit 131, a storage unit 132, a network communication unit 133, and a control unit 134. Note that the configuration illustrated in FIG. 9 is a functional configuration. A hardware configuration may be different from this configuration. The functions of the communication control device 130 may be realized in a distributed manner in a plurality of physically separated components. For example, the communication control device 130 may be configured by a plurality of server devices.

The radio communication unit 131 is a radio communication interface that wirelessly communicates with other communication devices (for example, the communication device 110, the terminal device 120, the intermediate device 110C, and the other communication control devices 130). The radio communication unit 131 operates according to the control of the control unit 134. The radio communication unit 131 is adapted to one or a plurality of radio access schemes. For example, the radio communication unit 131 is adapted to both of NR and LTE. The radio communication unit 131 may be adapted to other radio access schemes such as W-CDMA and cdma 2000. The configuration of the radio communication unit 131 is similar to the configuration of the radio communication unit 111 of the communication device 110.

The storage unit 132 is a storage device capable of reading and writing data such as a DRAM, an SRAM, a flash memory, or a hard disk. The storage unit 132 functions as storage means of the communication device 110. The storage unit 132 stores operation parameters of each of the plurality of communication devices 110 configuring the communication network system 100. Note that the storage unit 132 may store owned resource information of each of the plurality of communication devices 110 configuring the communication network system 100. As explained above, the owned resource information is information concerning owning of radio resources of the communication device 110.

The network communication unit 133 is a communication interface for communicating with other devices (for example, the communication device 110, the intermediate device 110C, and the other communication control devices 130). The network communication unit 133 may be a network interface or may be an equipment connection interface. For example, the network communication unit 133 may be a LAN (Local Area Network) interface such as a NIC (Network Interface Card). The network communication unit 133 may be a USB (Universal Serial Bus) interface configured by a USB host controller, a USB port, and the like. The network communication unit 133 may be a wired interface or may be a radio interface. The network communication unit 133 functions as communication means of the communication control device 130. The network communication unit 133 communicates with the communication device 110, the terminal device 120, and the intermediate device 110C according to the control of the control unit 134.

The control unit 134 is a controller that controls the units of the communication control device 130. The control unit 134 is realized by a processor such as a CPU or an MPU. For example, the control unit 134 is realized by the processor executing various programs stored in a storage device inside the communication control device 130 using a RAM or the like as a work area. Note that the control unit 134 may be realized by an integrated circuit such as an ASIC or an FPGA. All of the CPU, the MPU, the ASIC, and the FPGA can be regarded as the controller.

As illustrated in FIG. 9, the control unit 134 includes an acquiring unit 1341, an interference ratio calculating unit 1342, a guard band calculating unit 1343, and a notifying unit 1344. The functional blocks (the acquiring unit 1341 to the notifying unit 1344) configuring the control unit 134 are respectively functional blocks indicating the functions of the control unit 134. These functional blocks may be software blocks or may be hardware blocks. For example, each of the functional blocks explained above may be one software module realized by software (micro programs) or may be one circuit block on a semiconductor chip (die). Naturally, each of the functional blocks may be one processor or one integrated circuit. A configuration method for the functional blocks is optional. Note that the control unit 134 may be configured in a functional unit different from the functional blocks explained above. The operations of the blocks configuring the control unit 134 are explained below.

Note that the control unit 114 of the communication device 110 and the control unit 114c of the intermediate device 110C may have the functional blocks (the acquiring unit 1341 to the notifying unit 1344) included in the control unit 134 of the communication control device 130. In this case, the description of "communication control device 130" appearing in the following explanation can be replaced with "communication device 110" or "intermediate device 110C" as appropriate. The descriptions of "control unit 134", "acquiring unit 1341", "interference ratio calculating unit 1342", "guard band calculating unit 1343", and "notifying unit 1344" appearing in the following explanation can also be replaced with "control unit 114" or "control unit 114c" as appropriate.

3. EXPLANATION OF PROCEDURES ASSUMED IN THE PRESENT EMBODIMENT

Here, a basic procedure that can be used in the implementation of the present embodiment is explained. Note that it is assumed that a procedure up to <3-5.> explained below is mainly implemented in the communication device 110A (or the communication device 110B) functioning as the communication device 110.

3-1. Registration Procedure

A registration procedure is a procedure for registering information of a radio system (a primary system or a secondary system) about to use a shared frequency band. More specifically, the registration procedure is a procedure for registering, in the communication control device 130, device parameters concerning the communication device 110 of the radio system. Typically, the registration procedure is started when the communication device 110 representing the radio system about to use the shared frequency band notifies the communication control device 130 of a registration request including device parameter. Note that, when a plurality of communication devices 110 belong to the radio system about to use the shared frequency band, the device parameters of each of the plurality of communication devices 110 are included in the registration request. A device that transmits a registration request representing the radio system may be decided as appropriate.

3-1-1. Details of Required Parameters

The device parameters indicate, for example, information explained below.

Information concerning the user of the communication device 110 (hereinafter described as user information)
Specific information of the communication device 110 (hereinafter described as specific information)
Information concerning the position of the communication device 110 (hereinafter described as position information)
Information concerning an antenna included in the communication device 110 (hereinafter referred to as antenna information)
Information concerning the radio interface included in the communication device 110 (hereinafter described as radio interface information)
Legal information concerning the communication device 110 (hereinafter described as legal information)
Information concerning an installer of the communication device 110 (hereinafter described as installer information)
Information concerning a group to which the communication device 110 belongs (hereinafter, group information)

Note that device parameters are not limited to the device parameters explained above. Information other than these kinds of information may be treated as device parameters. Note that the device parameters do not need to be transmitted by one registration request and may be separately transmitted a plurality of times. That is, a plurality of registration requests may be transmitted for one registration procedure. In this way, one procedure or one processing in a procedure may be separately performed a plurality of times. The same applies to a procedure explained below.

The user information is information related to the user of the communication device 110. For example, a user ID, an account name, a user name, a user contact, and a call sign can be assumed. The user ID and the account name may be independently generated by the user of the communication device 110 or may be issued in advance by the communication control device 130. As the call sign, it is desirable to use a call sign issued by the NRA.

The user information can be used, for example, for interference resolution. As a specific example, in a frequency use notification procedure explained below, the user information is used when the communication control device 130 performs use stop determination for a frequency being used by the communication device 110 and performs an instruction based on the use stop determination and when a frequency use notification request of the frequency is subsequently notified. In that case, the communication control device 130 can doubt a failure of the communication device 110 and notify the user contact address included in the user information of a behavior confirmation request of the communication device 110. Without being limited to this example, when it is determined that the communication device 110 is performing an operation against the communication control performed by the communication control device 130, the communication control device 130 can make a contact using the user information.

The specific information is information capable of specifying the communication device 110, product information of the communication device 110, information concerning hardware or software of the communication device 110, and the like.

For example, a manufacturing number (a serial number) of the communication device 110 and an ID of the communication device 110 can be include in the information capable of specifying the communication device 110. The ID of the communication device 110 may be, for example, an ID uniquely given by the user of the communication device 110.

For example, an authentication ID, a product model number, and information concerning a manufacturer can be included as the product information of the communication device 110. The authentication ID is an ID given from certification authorities in countries or regions such as an FCC ID of the United States, a CE number of Europe, and a technical standard conformity certificate (technical standard) of Japan. An ID issued by an industry association or the like based on a unique authentication program may also be regarded as the authentication ID.

The specific information represented by these kinds of information can be used, for example, in a use of a whitelist or a blacklist. For example, when any information concerning the communication device 110 in operation is included in the blacklist, the communication control device 130 can instruct frequency use stop to the communication device 110 in a frequency use notification procedure explained below. Further, the communication control device 130 can take a behavior of not releasing a usage stop measure until the communication device 110 is released from the blacklist. Further, for example, the communication control device 130 can reject registration of the communication device 110 included in the blacklist. For example, the communication control device 130 can also perform an operation of not considering the communication device 110 corresponding to information included in the blacklist in the interference calculation of the present disclosure or considering only the communication device 110 corresponding to information included in the whitelist in the interference calculation.

In the present disclosure, the FCC ID may also be treated as transmission power information. In an EAS (Equipment Authorization System) database (disclosed by the API in https://apps.fcc.gov/oetcf/kdb/forms/FTSSearchResult-Page.cfm?switch=P&id=50070), which is a type of a regulatory database, it is possible to acquire device information that has been authenticated. The information included in this includes, together with the FCC ID, authenticated maximum EIRP information (Certified maximum EIRP). Since the power information is linked with the FCC ID, the FCC ID can be treated as the transmission power information. Similarly, the FCC ID may be treated as an ID equivalent to other information included in the EAS. Without being limited to the FCC ID, when information linked with the authentication ID is present, the authentication ID may be treated as an ID equivalent to the information.

For example, transmission power class information can be included in the information concerning hardware of the communication device 110. For example, in FCC C.F.R. (Code of Federal Regulations) Part 96 of the United States, two types of classes, that is, Category A and Category B, are stipulated as the transmission power class information. Information indicating which of the two types of classes the information belongs to can be included in information concerning the hardware of the communication device 110 conforming to the stipulation. In TS (Technical Specification) 36.104 and TS 38.104 of 3GPP (3rd Generation Partnership Project), some classes of eNodeB and gNodeB are stipulated, and these stipulations can also be used.

The transmission power class information can be used, for example, in a use of interference calculation. The interference calculation can be performed using maximum transmission power stipulated for each of the classes as transmission power of the communication device 110.

For example, version information, a build number, and the like concerning an execution program in which processing necessary for interaction with the communication control device 130 is described can be included in the information concerning software of the communication device 110. Version information, a build number, and the like of software for the communication device 110 to operate may also be included.

The position information is typically information capable of specifying a geographical position of the communication device 110. The position information is, for example, coordinate information acquired by a positioning function represented by a GPS (Global Positioning System), Beidou, a QZSS (Quasi-Zenith Satellite System), Galileo, or an A-GPS (Assisted Global Positioning System). Typically, information related to latitude, longitude, ground level/sea level, altitude, and a positioning error can be included in the position information. Alternatively, for example, the position information may be position information registered in an information management device managed by the NRA (National Regulatory Authority) or its agency. Alternatively, for example, the position information may be coordinates of an X axis, a Y axis, and a Z axis having an origin in a specific geographical position. Together with such coordinate information, an identifier indicating whether the communication device 110 is present outdoors or indoors can be given.

Note that, when the coordinate information is the position information, positioning accuracy information (location uncertainty) may be included in the position information. For example, both or one of a horizontal plane and a vertical plane may be provided. The positioning accuracy information (location uncertainty) may be used as, for example, a correction value in calculating a distance to any point.

The position information may be information indicating an area where the communication device 110 is located. Information indicating an area determined by the government such as a postal code or an address may be used. For example, the area may be indicated by a set of three or more geographic coordinates. These kinds of information indicating the areas may be provided together with the coordinate information.

When the communication device 110 is located indoors, information indicating a floor of a building where the communication device 110 is located can also be included in the position information. For example, an identifier indicating the number of floors, the ground, or the underground can be included in the position information. Information indicating a further indoor closed space such as a room number and a room name in the building can be included in the position information.

Typically, the positioning function is desirably included in the communication device 110. However, the performance of the positioning function sometimes does not meet required accuracy. Even if the performance of the positioning function satisfies the required accuracy, the position information satisfying the required accuracy sometimes cannot be acquired depending on an installation position of the communication device 110. Therefore, a device different from the communication device 110 may include the positioning function. The communication device 110 may acquire information related to a position from the device. The device having the positioning function may be an available existing device but may be provided by the installer of the communication device 110. In such a case, it is desirable that position information measured by the installer of the communication device 110 is written in the communication device 110.

The antenna information is typically information indicating performance, a configuration, and the like of an antenna included in the communication device 110. Typically, information such as an antenna installation height, a tilt angle (Downtilt), a horizontal orientation (Azimuth), a boresight, an antenna peak gain, and an antenna model can be included in the antenna information.

Information concerning a formable beam can also be included in the antenna information. For example, information such as a beam width, a beam pattern, and analog or digital beamforming capability can be included in the antenna information.

Information concerning performance and a configuration of MIMO (Multiple Input Multiple Output) communication can also be included in the antenna information. Information such as the number of antenna elements and the maximum number of spatial streams can be included in the antenna information. Codebook information to be used, weight matrix information, and the like can also be included in the antenna information. The weight matrix information includes a unitary matrix, a ZF (Zero-Forcing) matrix, and a MMSE (Minimum Mean Square Error) matrix, which are obtained by SVD (Singular Value Decomposition), EVD (Eigen Value Decomposition), BD (Block Diagonalization), and the like. When the communication device 110 includes a function such as MLD (Maximum Likelihood Detection) requiring nonlinear calculation, information indicating the included function may be included in the antenna information.

ZoD (Zenith of Direction, Departure) may be included in the antenna information. The ZoD is a type of a radio wave arrival angle. Note that, the ZoD may not be notified from the communication device 110 and may be estimated by another communication device 110 from a radio wave radiated from the antenna of the communication device 110 and may be notified. In this case, the communication device 110 may be a device that operates as a base station or an access point, a device that performs D2D communication, a moving relay base station, or the like. The ZoD can be estimated by a radio wave arrival direction estimation technology such as MUSIC (Multiple Signal Classification) or ESPRIT (Estimation of Signal Propagation via Rotation Invariance Techniques). The ZoD can be used by the communication control device 130 as measurement information.

The radio interface information is typically information indicating a radio interface technology included in the communication device 110. For example, identifier information indicating a technology used in GSM (registered trademark), CDMA 2000, UMTS, E-UTRA, E-UTRA NB-IoT, 5G NR, 5G NR NB-IoT, or a further next generation cellular system can be included as the radio interface information. Identifier information indicating a derivative technology conforming to LTE (Long Term Evolution)/5G such as MulteFire, LTE-U (Long Term Evolution-Unlicensed), or NR-U (NR-Unlicensed) can also be included in the radio interface information. Identifier information indicating a standard technology such as a MAN (Metropolitan Area Network) such as WiMAX or WiMAX 2+ or a wireless LAN of the IEEE 802.11 series can also be included in the radio interface information. The radio interface information may be identifier information indicating an XGP (Extended Global Platform) or an sXGP (Shared XGP). The radio interface information may be identifier information of a communications technology for LPWA (Local Power, Wide Area). Identifier information indicating a proprietary radio technology can also be included in the radio interface information. A version number or a release number of technical specifications defining these technologies can also be included as the radio interface information.

Frequency band information supported by the communication device 110 can also be included in the radio interface information. For example, the frequency band information can be represented by an upper limit frequency, a lower limit frequency, a center frequency, a bandwidth, a 3GPP Operating Band number, or a combination of at least two of these. In addition, one or more kinds of frequency band information can be included in the radio interface information.

Further, information indicating capability of a band extension technology such as carrier aggregation (CA) or channel bonding can also be included as the frequency band information supported by the communication device 110. For example, combinable band information or the like can be included as the frequency band information. About the carrier aggregation, information concerning a band to be used as a primary component carrier (PCC) or a secondary component carrier (SCC) can be included as the frequency band information. The number of component carriers (the number of CCs) that can be simultaneously aggregated can be included as the frequency band information.

As the frequency band information supported by the communication device 110, information indicating a combination of frequency bands supported by the dual connectivity and the multi connectivity may be further included. In addition, information concerning another communication device 110 that cooperatively provides the dual connectivity and the multi connectivity may also be provided. In the subsequent procedures, the communication control device 130 may determine the communication control disclosed in the present embodiment taking into account another communication device 110 having a cooperative relation or the like.

As the frequency band information supported by the communication device 110, information indicating radio wave use priority such as PAL and GAA can also be included.

In the radio interface information, modulation scheme information supported by the communication device 110 can also be included. For example, as a representative example, information indicating a primary modulation scheme such as FSK (Frequency Shift Keying), n-value PSK (Phase Shift Keying, where n is a multiplier of 2 such as 2, 4, and 8), and n-value QAM (Quadrature Amplitude Modulation, where n is a multiplier of 4 such as 4, 16, 64, 256, and 1024) can be included. Information indicating a secondary modulation scheme such as OFDM (Orthogonal Frequency Division Multiplexing), scalable OFDM, DFT-s-OFDM (DFT spread OFDM), GFDM (Generalized Frequency Division Multiplexing), and filter bank multi carrier (FBMC) can be included.

Information concerning an error correction code can also be included in the radio interface information. For example, capabilities such as a turbo code, an LDPC (Low Density Parity Check) code, a polar code, and an erasure correction code, and encoding rate information to be applied can be included in the radio interface information.

The modulation scheme information and the information related to the error correction code can also be represented by an MCS (Modulation and Coding Scheme) index as another aspect.

Information indicating functions specific to radio technical specifications supported by the communication device 110 can also be included in the radio interface information. For example, as a representative example, there is Transmission Mode (TM) information stipulated by the LTE. Besides, information having two or more modes concerning a specific function can be included in the radio interface information like TM information. In the technical specifications, when the communication device 110 supports a function that is not essential in the specification even if two or more modes absent, information indicating the supported function can also be included in the radio interface information.

Radio access scheme (RAT: Radio Access Technology) information supported by the communication device 110 can also be included in the radio interface information. Information indicating, for example, TDMA (Time Division Multiple Access), FDMA (Frequency Division Multiple Access), OFDMA (Orthogonal Frequency Division Multiple Access), PDMA (Power Division Multiple Access), CDMA (Code Division Multiple Access), SCMA (Sparse Code Multiple Access), IDMA (Interleave Division Multiple Access), SDMA (Spatial Division Multiple Access), CSMA/CA (Carrier Sense Multiple Access/Collision Avoidance), and CSMA/CD (Carrier Sense Multiple Access/Collision Detection) can be included in the radio interface information. Note that TDMA, FDMA, and OFDMA are classified into orthogonal multiple access (OMA). PDMA, CDMA, SCMA, IDMA, and SDMA are classified into non-orthogonal multiple access (NOMA). A representative example of the PDMA is a method realized by a combination of Superposition Coding (SPC) and Successive Interference Canceller (SIC). CSMA/CA and CSMA/CD are classified into opportunistic access.

When information indicating the opportunistic access is included in the radio interface information, information indicating details of an access scheme may be further included in the radio interface information. As a specific example, information indicating Frame Based Equipment (FBE) or Load Based Equipment (LBE) defined in EN 301 598 of ETSI may be included in the radio interface information.

When the radio interface information indicates the LBE, the radio interface information may further include LBE specific information such as a priority class specified by EN 301 598 of ETSI.

Information related to a duplex mode supported by the communication device 110 can also be included in the radio interface information. As a representative example, information concerning a scheme such as FDD (Frequency Division Duplex), TDD (Time Division Duplex), or FD (Full Duplex) can be included in the radio interface information.

When the TDD is included as the radio interface information, TDD frame structure information used or supported by the communication device 110 can be given. Information related to the duplex mode may be included for each of frequency bands indicated by frequency band information.

When the FD is included as the radio interface information, information concerning an interference power detection level may be included in the radio interface information.

Information concerning a transmission diversity method supported by the communication device 110 can also be included in the radio interface information. For example, space time coding (STC) or the like may be included in the radio interface information.

Guard band information can also be included in the radio interface information. For example, information concerning a predetermined guard band size can be included in the radio interface. Alternatively, for example, information concerning a guard band size desired by the communication device 110 may be included in the radio interface information.

Irrespective of the aspects explained above, the radio interface information may be provided for each of frequency bands.

The legal information typically means information concerning regulations that the communication device 110 has to observe defined by radio administration agencies or equivalent agencies in countries or regions, authentication information acquired by the communication device 110, or the like. Typically, for example, upper limit value information of out-of-band radiation, and information concerning a blocking characteristic of a receiver can be included as the information concerning the regulations. Typically, for example, type approval information and legal/regulatory information serving as a reference of authentication acquisition can be included as the authentication information. For example, FCC ID of the United States and technical standard conformity certification of Japan correspond to the type authentication information. For example, an FCC regulation number of the United States and an ETSI Harmonized Standard number of Europe correspond to the legal/regulatory information.

Among the legal information, about information concerning numerical values, information decided in specifications of the radio interface technology may be substituted. For example, 3GPP TS 36.104 and TS 38.104 correspond to the specifications of the radio interface technology. An adjacent channel leakage ratio (ACLR) is specified for the standards. Instead of the upper limit value information of the out-of-band radiation, an upper limit value of the out-of-band radiation may be derived using ACLR specified by the specifications and may be used. The ACLR itself may be used according to necessity. Adjacent channel selectivity (ACS) may be used instead of the blocking characteristic. The blocking characteristic and the adjacent channel selectivity may be concurrently used or an adjacent channel interference ratio (ACIR) may be used. Note that, in general, the ACIR has a relation like Expression (1) shown below between the ACLR and the ACS. Note that, although Expression (1) uses true value expression, Expression (1) may be represented by logarithmic representation $$ACIR = \left(\frac{1}{ACS} + \frac{1}{ACLR}\right)^{-1} \quad (1)$$

Information capable of specifying a person who installed the communication device 110 (an installer), unique information linked with the installer, and the like can be included in the settler information. Representatively, information concerning an individual who is responsible for the position information of the communication device 110 such as a certified professional installer (CPI) defined in Non Patent Literature 3 can be included in the installer information. CPI discloses a CPIR-ID (Certified Professional Installer Registration ID) and a CPI name. As specific information linked with the CPI, for example, a contact address (a mailing address or a contact address), an e-mail address, a telephone number, and a PKI (Public Key Identifier) are disclosed. Without being limited to these kinds of information, other information concerning the installer may be included in the installer information according to necessity.

Information concerning a communication device group to which the communication device 110 belongs can be included in the group information. Specifically, for example, information related to the same or equivalent type of group as a group disclosed in WINNF-SSC-0010 can be included in the group information. For example, when a communication carrier manages the communication device 110 in units of groups according to an operation policy of the communication carrier, information concerning the groups can be included in the group information.

The information enumerated above may not be provided to the communication control device 130 by the communication device 110 and may be estimated by the communication control device 130 from other information provided from the communication device 110. Specifically, for example, the guard band information can be estimated from the radio interface information. When the radio interface used by the communication device 110 is E-UTRA or 5G NR, the guard band information can be estimated based on a transmission bandwidth specification of E-UTRA described in TS 36.104 of 3GPP, a transmission bandwidth specification of 5G NR described in TS 38.104 of 3GPP, and a table described in TS 38.104 illustrated in FIG. 10 to FIG. 13.

Figure 14:
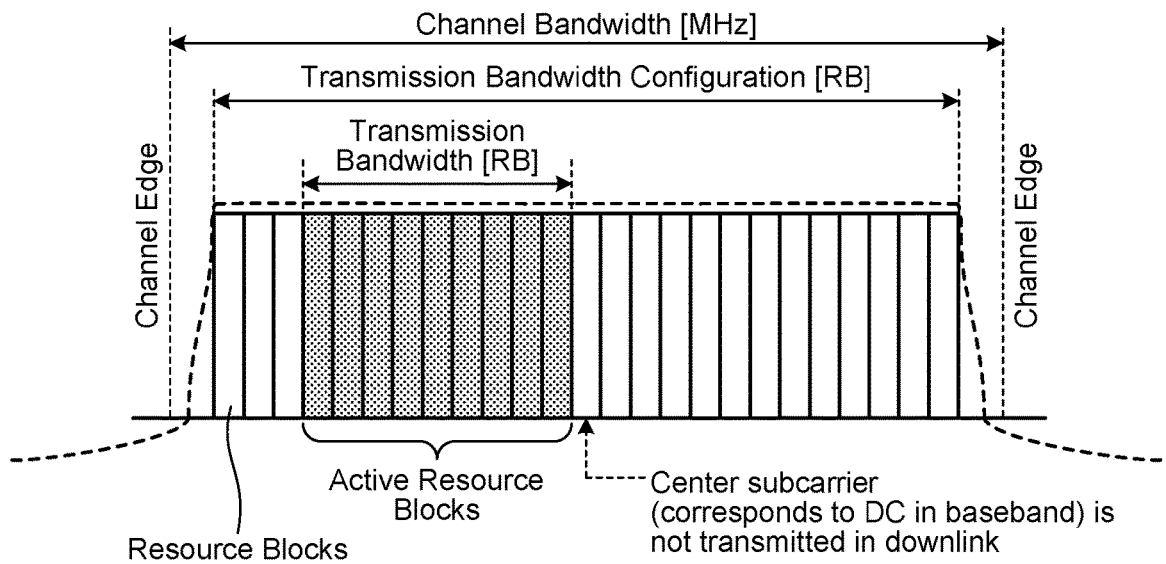
FIG. 14 is a diagram illustrating a definition of an E-UTRA carrier indicated by TS 36.104 of 3GPP.
Figure 15:
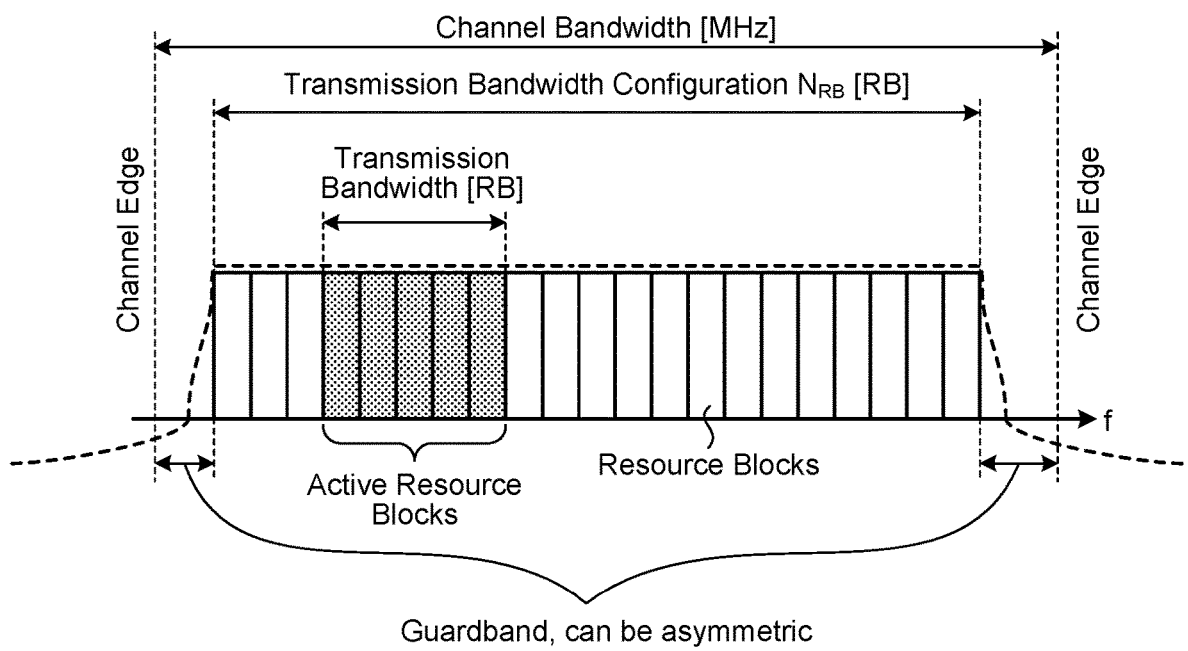
FIG. 15 is a diagram illustrating a definition of an NR channel indicated by TS 38.104 of 3GPP.

Note that FIG. 10 is a diagram cited from Table 5.6-1 of TS 36.104 of 3GPP and is a diagram concerning Transmission bandwidth configuration NRB in E-UTRA channel bandwidths. FIG. 11 is a diagram cited from Table 5.3.3-1 of TS 38.104 of 3GPP and is a diagram concerning Minimum guardband (kHz) (FR1). FIG. 12 is a diagram cited from Table 5.3.3-2 of TS 38.104 of 3GPP and is a diagram concerning Minimum guardband (kHz) (FR2). FIG. 13 is a diagram cited from TS 38.104 Table: 5.3.3-3 of 3GPP and is a diagram concerning Minimum guardband (kHz) of SCS 240 kHz SS/PBCH block (FR2). FIG. 14 is a diagram illustrating a definition of an E-UTRA carrier indicated by TS 36.104 of 3GPP. FIG. 15 is a diagram illustrating a definition of an NR channel indicated by TS 38.104 of 3GPP.

In other words, the communication control device 130 only has to be able to acquire the information enumerated above. The communication device 110 does not always need to provide the information to the communication control device 130. The intermediate device 110C (for example, a network manager) that manages the plurality of communication devices 110 does not need to provide the information to the communication control device 130A. The communication device 110 or the intermediate device 110C providing information to the communication control device 130 or 130A is merely one means for information provision in the present embodiment. The information enumerated above means information that can be necessary for the communication control device 130 to normally complete this procedure. Means for providing the information does not matter. For example, WINNF-TS-0016 and WINNF-TS-0061 (called as Multi-Step Registration) allow such a method.

Naturally, the information enumerated above is selectively applicable according to a legal system and technical specifications.

3-1-1-1. Supplement of Required Parameters

In the registration procedure, in some cases, it is assumed that device parameters concerning not only the communication device 110 but also the terminal device 120 are requested to be registered in the communication control device 130. In such a case, the term "communication device" in the explanation in <3-1-1.> may be replaced with a term "terminal device" or a term equivalent thereto and applied. Parameters specific to the "terminal device" not explained in <3-1-1.> may also be treated as the required parameters in the registration procedure. Examples of the parameters specific to the terminal device include a UE (User Equipment) category specified by the 3GPP.

3-1-2. Details of Registration Processing

As explained above, the communication device 110 representing the radio system about to use the shared frequency band generates the registration request including the device parameters and notifies the communication control device 130 of the registration request.

Here, when the installer information is included in the device parameters, the communication device 110 may apply tamper-proof processing or the like to the registration request using the installer information. Encryption processing may be applied to a part or all of the information included in the registration request. Specifically, for example, a unique public key may be shared in advance between the communication device 110 and the communication control device 130. The communication device 110 may apply encryption to information using a secret key corresponding to the public key. Examples of a target of the encryption include security sensitive information such as position information.

Note that, in some cases, IDs and position information of the communication devices 110 are disclosed and the communication control device 130 stores in advance an ID and position information of the main communication device 110 present in a coverage of the communication control device 130. In such a case, since the communication control device 130 can acquire position information from an ID of the communication device 110 that has transmitted a registration request, the position information does not need to be included in the registration request. It is also conceivable that the communication control device 130 returns necessary device parameters to the communication device 110 that has transmitted the registration request and, in response, the communication device 110 transmits a registration request including the device parameters necessary for registration. In this way, the information included in the registration request may be different depending on the case.

After receiving the registration request, the communication control device 130 implements registration processing of the communication device 110 and returns a registration response according to a processing result. If there is no shortage or abnormality of information necessary for the registration, the communication control device 130 records the information in an internal or external storage device and notifies normal completion. Otherwise, the communication control device 130 notifies a registration failure. When the registration is normally completed, the communication control device 130 may allocate an ID individually to the communication device 110 and notify information of the ID at a response time. In a case of a registration failure, the communication device 110 may notify a corrected registration request again. The communication device 110 may change the registration request and attempt the registration procedure until the registration is normally completed.

Note that the registration procedure is sometimes executed even after the registration is normally completed. Specifically, the registration procedure can be executed again when the position information is changed to exceed a predetermined standard because of, for example, movement/accuracy improvement. The predetermined standard is typically decided by legal systems in countries or regions. For example, in 47 C.F.R. Part 15 of the United States, when the position of a Mode II personal/portable white space device, that is, equipment that uses a free frequency changes by 100 meters or more, the device is obliged to perform registration again.

3-2. Available Frequency Information Inquiry Procedure (Available Spectrum Query Procedure)

An available frequency information inquiry procedure is a procedure in which a radio system about to use a shared frequency band inquires the communication control device 130 about information on an available frequency. Note that the available frequency information inquiry procedure does not always need to be implemented. The communication device 110 that makes an inquiry representing the radio system about to use the shared frequency band may be the same as or different from the communication device 110 that has generated the registration request. Typically, the communication device 110 that makes an inquiry notifies the communication control device 130 of an inquiry request including information capable of specifying the communication device 110, whereby the procedure is started.

Here, the available frequency information typically means information indicating a frequency at which the communication device 110 does not give fatal interference to a primary system and secondary use is safely possible.

The available frequency information is determined, for example, based on a secondary use prohibited area called an exclusion zone. Specifically, for example, when the communication device 110 is installed in the secondary use prohibited area provided for the purpose of protecting a primary system that uses a frequency channel F1, the frequency channel F1 is not notified to the communication device 110 as an available channel.

The available frequency information may be determined by, for example, a degree of given interference against the primary system as well. Specifically, for example, when it is determined that the critical interference is given to the primary system even outside the secondary utilization prohibited area, the frequency channel is sometimes not notified as an available channel. An example of a specific calculation method is described in <3-2-2.> below.

As explained above, a frequency channel not notified as available can be present depending on conditions other than primary system protection requirements. Specifically, for example, in order to avoid, in advance, interference that could occur between the communication devices 110, a frequency channel being used by another communication device 110 present near the communication device 110 is sometimes not notified as an available channel. In this way, the available frequency information set considering interference with the other communication device 110 may be set as, for example, "use recommended frequency information" and provided together with the available frequency information. That is, the "use recommended frequency information" is desirably a subset of the available frequency information.

Even when influence is given to the primary system, if the influence can be avoided by reducing transmission power, the same frequency as the frequency of the primary system or the communication device 110 in the vicinity can be notified as an available channel. In such a case, typically, maximum allowable transmission power information is included in the available frequency information. Maximum allowable transmission power is typically represented by equivalent isotropic radiated power (EIRP). Without being always limited to this, the maximum allowable transmission power may be provided by, for example, a combination of antenna power (Conducted Power) and an antenna gain. Further, an allowable peak gain may be set as the antenna gain for each of spatial directions.

3-2-1. Details of Required Parameters

As the information capable of specifying the radio system about to use the shared frequency band, for example, specific information registered at the time of the registration procedure, the ID information explained above, and the like can be assumed.

Inquiry requirement information can also be included in the inquiry request. For example, information indicating a frequency band desired to know whether available can be included in the inquiry requirement information. For example, transmission power information can also be included in the inquiry requirement information. The communication device 110 that makes an inquiry can include transmission power information, for example, when it is desired to know only frequency information in which desired transmission power can be used. The inquiry requirement information does not always need to be included in the inquiry request.

A measurement report can also be included in the inquiry request. Results of measurement implemented by the communication device 110 and/or the terminal device 120 are included in the measurement report. A part or all of the results of the measurement may be represented by raw data or may be represented by processed data. For example, standardized metrics represented by RSRP (Reference Signal Received Power), RSSI (Reference Signal Strength Indicator), and RSRQ (Reference Signal Received Quality) can be used for measurement.

3-2-2. Details of Available Frequency Evaluation Processing

After receiving the inquiry request, the available frequency is evaluated based on the inquiry requirement information. For example, as explained above, the available frequency can be evaluated considering the primary system, the secondary use prohibited area of the primary system, and the presence of the communication device 110 in the vicinity.

The communication control device may calculate the secondary use prohibited area. For example, when maximum and minimum transmission powers are specified, a separation distance can be calculated as indicated by Expression (2) shown below.

$$PL^{-1}(P_{MaxTx(dBm)} - I_{Th(dBm)}) \leq d < PL^{-1}(P_{MinTx(dBm)} - I_{Th(dBm)}) \quad (2)$$

Consequently, frequency availability can be determined according to a positional relation between the primary system and the communication device. When transmission power information (or power range information) desired to be used by the communication device is supplied as a request, the frequency availability can be determined by calculating $PL^{-1}(P_{TX(dBm)} - I_{Th(dBm)})$ and comparing $PL^{-1}(P_{Tx(dBm)} - I_{Th(dBm)})$ with the range expression (2) described above.

Maximum transmission power (assuming the same channel) in the position of the communication device is calculated using allowable interference power information of the primary system, calculation reference position (reference point) information of an interference power level suffered by the primary system, registration information of the communication device, and a propagation loss estimation model. As an example, the maximum transmission power in the position of the communication device is calculated by Expression (3) shown below.

$$P_{MaxTx(dBm)} - I_{Th(dBm)} + PL(d)_{(dB)} \quad (3)$$

In this case, maximum transmission power available in a channel being used by the primary system is $P_{MaxTx\ (dBm)}$. The maximum transmission power can be calculated in the same manner for an adjacent channel by taking into account the ACRL and the out-of-band radiation maximum value.

Maximum allowable transmission power information may be derived. Typically, the maximum allowable transmission power information is calculated using allowable interference power information in the primary system or a protection zone (a protected space) of the primary system, position information of a reference point for calculating an interference power level suffered by the primary system, registration information of the communication device 110, and a propagation loss estimation model. Specifically, as an example, the maximum allowable transmission power information is calculated by Expression (3) described above.

Here, PMaxTx (dBm) is maximum allowable transmission power, ITh (dBm) is allowable interference power (a limit value of allowable interference power), d is a distance between a predetermined reference point and the communication device 110, and PL (d) (dB) is a propagation loss at the distance d. In Expression (3), an antenna gain in a transceiver is not included. However, the antenna gain in the transceiver may be included according to an expression method (EIRP, conducted power, or the like) of the maximum allowable transmission power or a reference point of reception power (an antenna input point, an antenna output point, or the like). A feeder loss may be considered according to necessity. The maximum transmission power can be calculated in the same manner for an adjacent channel by taking into account the ACRL and the out-of-band radiation maximum value.

Expression (3) is described based on assumption that a single communication device 110 is an interference source (single station interference). For example, when cumulative interference (Aggregated Interference) from a plurality of communication devices 110 has to be considered at the same time, a correction value may be taken into account. Specifically, for example, the correction value can be determined based on three kinds of (Fixed/Predetermined, Flexible, and Flexible Minimized) interference margin schemes disclosed in Non Patent Literature 4 (ECC Report 186).

Note that the allowable interference power information itself cannot always be directly used as in Expression (3). For example, when a required signal power-to-interference power ratio (SIR), an SINR (Signal to Interference Plus Noise Ratio), an INR (Interference-to-Noise Ratio), and the like of the primary system are available, those may be converted into allowable interference power and used. Note that such conversion processing is not limited to this processing and may be applied to processing of other procedures.

Although Expression (3) is expressed using logarithms, naturally, Expression (3) may be converted into a true number and used in practice. All parameters in logarithmic notation described in the present disclosure may be converted into true numbers and used as appropriate.

When the transmission power information explained above is included in the inquiry requirement information, the available frequency can be evaluated by a method different from the method explained above. Specifically, for example, when it is assumed that desired transmission power indicated by the transmission power information is used, when an estimated given interference amount is less than allowable interference power in the primary system or the protection zone of the primary system, it is determined that the frequency channel is available and the frequency channel is notified to the communication device 110.

For example, as in an area of a REM (Radio Environment Map), when an area or a space in which the communication device 110 is capable of using the shared frequency band is determined in advance, the available frequency information may be simply derived based on only coordinates (coordinate of the X axis, the Y axis, and the Z axis of the communication device 110 and latitude, longitude, and ground level) included in the position information of the communication device 110. For example, even when a lookup table that associates coordinates of the position of the communication device 110 and available frequency information is prepared, the available frequency information may be derived based on only the position information of the communication device 110. As explained above, there are various methods of determining the available frequency. The methods are not limited to the example in the present disclosure.

When the communication control device 130 acquires information concerning capability of a band extension technology such as carrier aggregation (CA) or channel bonding as the frequency band information supported by the communication device 110, the communication control device 130 may include an available combination, a recommended combination, or the like of the information in the available frequency information.

When the communication control device 130 acquires information concerning a combination of frequency bands supported by the dual connectivity and the multi connectivity as the frequency band information supported by the communication device 110, the communication control device 130 may include information such as an available frequency and a recommended frequency in the available frequency information for the dual connectivity and the multi connectivity.

When the available frequency information is provided for the band extension technology explained above, when imbalance of the maximum allowable transmission power occurs among a plurality of frequency channels, the available frequency information may be provided after the maximum allowable transmission powers of the frequency channels are adjusted. For example, from a viewpoint of primary system protection, the maximum allowable transmit powers of the frequency channels may be aligned with maximum allowable transmit power of a frequency channel having a low maximum allowable power flux density (PSD: Power Spectral Density).

The evaluation of the available frequency does not always need to be implemented after the inquiry request is received. For example, after the normal completion of the registration procedure explained above, the communication control device 130 may independently implement the evaluation without an inquiry request. In such a case, the REM or the lookup table explained as an example in the above explanation or an information table similar to the REM or the lookup table may be created.

The radio wave utilization priority such as PAL or GAA may also be evaluated. For example, when information concerning priority levels of radio wave use is included in registered device parameters or inquiry requirements, it may be determined based on the priority levels and notified whether frequency use is possible. For example, as disclosed in Non Patent Literature 3, when information (in Non Patent Literature 3, called cluster list) concerning the communication device 110 that performs high priority use (for example, PAL) is registered in the communication control device 130 from the user beforehand, the evaluation may be performed based on the information.

In all of the calculations explained above, when the position information of the communication device is used, frequency availability may be determined by applying correction of the position information and the coverage using the positioning accuracy information (location uncertainty).

After the evaluation of the available frequency is completed, the communication control device 130 notifies an evaluation result to the communication device 110.

The communication device 110 may select desired communication parameters using the evaluation result received from the communication control device 130.

3-3. Frequency Use Permission Procedure (Spectrum Grant Procedure)

A frequency use permission procedure is a procedure for the radio system about to use the shared frequency band to receive secondary use permission of a frequency from the communication control device 130. The communication device 110 that performs the frequency use permission procedure representing the radio system may be the same as or different from the communication device 110 that has performed the procedures explained above. Typically, the communication device 110 notifies the communication control device 130 of a frequency use permission request including information capable of specifying the communication device 110, whereby the procedure is started. Note that, as explained above, the available frequency information inquiry procedure is not essential. Therefore, the frequency use permission procedure is performed subsequently to the available frequency information inquiry procedure in some cases or is performed subsequently to the registration procedure in other cases.

Depending on a legal system, the frequency use permission procedure is not always performed. Spectrum grant is basically not used in the TVWS. In the CBRS, a mechanism of the Spectrum grant is used. The Spectrum grant may be properly used according to a legal system.

The Spectrum grant is useful for calculation of cumulative interference explained below. Therefore, a system may be adopted in which the Spectrum grant is adopted when the cumulative interference calculation is necessary and the Spectrum grant is not adopted when the cumulative interference calculation is unnecessary. This determination may be made at the time of designing of a mechanism based on the present specification or may be dynamically performed by the communication control device during actual operation.

In the present embodiment, it is assumed that at least the following two kinds of frequency use permission request schemes can be used.

Designation scheme

Flexible scheme

The designation scheme is a request scheme in which the communication device 110 designates desired communication parameters and requests the communication control device 130 to permit operation based on the desired communication parameters. The desired communication parameters include but are not particularly limited to a frequency channel desired to be used, maximum transmission power, and the like. For example, parameters (a modulation scheme, a duplex mode, and the like) specific to the radio interface technology may be designated. Information indicating radio wave utilization priority levels such as PAL and GAA may be included as the desired communication parameters.

The flexible scheme is a request scheme in which the communication device 110 designates only requirements concerning communication parameters and requests the communication control device 130 to designate communication parameters capable of permitting secondary use while satisfying the requirements. Examples of the requirements concerning the communication parameters include but are not particularly limited to a bandwidth, desired maximum transmission power, or desired minimum transmission power. For example, parameters (a modulation scheme, a duplex mode, and the like) specific to the radio interface technology may be designated. Specifically, for example, one or more of TDD frame structures may be selected in advance and notified.

Similarly to the inquiry request, a measurement report may be included in the frequency use permission request as well in both of the designation scheme and the flexible scheme. Results of measurement implemented by the communication device 110 and/or the terminal device 120 are included in the measurement report. The measurement may be represented by raw data or may be represented by processed data. For example, standardized metrics represented by RSRP (Reference Signal Received Power), RSSI (Reference Signal Strength Indicator), and RSRQ (Reference Signal Received Quality) can be used for measurement.

Note that the scheme information used by the communication device 110 may be registered in the communication control device 130 at the time of the registration procedure described in <3-1.>.

3-3-1. Details of Frequency Use Permission Processing

After receiving the frequency use permission request, the communication control device 130 performs frequency use permission processing based on the frequency use permission request scheme. For example, it is possible to perform, using the method explained in <3-2.>, the frequency use permission processing considering the primary system, the secondary use prohibited area, the presence of the communication device 110 in the vicinity, and the like. The present embodiment is applied to, for example, the frequency use permission processing. Details are explained below.

When the flexible scheme is used, the maximum allowable transmission power information may be derived using the method explained in <3-2-2.>. Typically, the maximum allowable transmission power information is calculated using allowable interference power information in the primary system or the protection zone of the primary system, position information of a reference point for calculating an interference power level suffered by the primary system, registration information of the communication device 110, and a propagation loss estimation model. Specifically, as an example, the maximum allowable transmission power information is calculated by Expression (3) described above.

As explained above, Expression (3) is described based on the assumption that the single communication device 110 is an interference source. For example, when cumulative interference (Aggregated Interference) from a plurality of communication devices 110 has to be considered at the same time, a correction value may be taken into account. Specifically, for example, the correction value can be determined based on three types of methods (Fixed/Predetermined, Flexible, and Flexible Minimized) disclosed in Non Patent Literature 4 (ECC Report 186).

The communication control device 130 can use various propagation loss estimation models in a frequency use permission procedure, available frequency evaluation processing for an available frequency information inquiry request, and the like. When a model is designated for each use, it is desirable to use the designated model. For example, in Non Patent Literature 3 (WINNF-TS-0112), a propagation loss model such as Extended Hata (eHATA) or Irregular Terrain Model (ITM) is adopted for the each use. Naturally, the propagation loss model is not limited these models.

A propagation loss estimation model that requires information concerning a radio wave propagation path is also present. For example, information indicating inside and outside of a line of sight (LOS: Line of Sight and/or NLOS: Non Line of Sight), topographical information (undulations, sea levels, and the like), and environmental information (Urban, Suburban, Rural, Open Sky, and the like) are included in the information concerning the radio wave propagation path. In using the propagation loss estimation model, the communication control device 130 may estimate these kinds of information from the already acquired registration information of the communication device 110 or information of the primary system. Alternatively, when there are parameters specified beforehand, it is desirable to use the parameters.

When a propagation loss estimation model is not designated in a predetermined use, the propagation loss estimation model may be properly used according to necessity. For example, when given interference power to the other communication device 110 is estimated, a model in which a loss is calculated small like a free space loss model is used. However, when a coverage of the communication device 110 is estimated, a model in which a loss is calculated large is used.

When a designated propagation loss estimation model is used, as an example, it is possible to perform the frequency use permission processing by evaluating a given interference risk. Specifically, for example, when it is assumed that the desired transmission power indicated by the transmission power information is used, when an estimated amount of given interference is less than the allowable interference power in the primary system or the protection zone of the primary system, it is determined that use of the frequency channel is permissible and the frequency channel is notified to the communication device 110.

In both the methods of the designation scheme and the flexible scheme, similarly to the inquiry request, the radio wave usage priority levels such as PAL or GAA may also be evaluated. For example, when information concerning the radio wave usage priority levels is included in the registered device parameters or the inquiry requirements, it may be determined based on the priority levels and notified whether frequency usage is possible. For example, when information concerning the communication device 110 that performs high priority use (for example, PAL) is registered in the communication control device 130 from the user in advance, evaluation may be performed based on the information. For example, in Non Patent Literature 3 (WINNF-TS-0112), information concerning the communication device 110 is called cluster list.

In all of the calculations explained above, when the position information of the communication device is used, frequency availability may be determined by applying correction of the position information and the coverage using the positioning accuracy information (location uncertainty).

The frequency use permission processing does not always need to be performed because of reception of a frequency use permission request. For example, after the normal completion of the registration procedure explained above, the communication control device 130 may independently implement the frequency use permission processing without the frequency use permission request. For example, the frequency use permission processing may be performed at every fixed period. In such a case, the REM or the lookup table explained above or an information table similar to the REM or the lookup table may be created. Consequently, since a frequency that can be permitted is determined only by the position information, the communication control device 130 can quickly return a response after receiving the frequency use permission request.

3-4. Frequency Use Notification (Spectrum Use Notification/Heartbeat)

The frequency use notification is a procedure in which the radio system using the shared frequency band notifies the communication control device 130 of use of a frequency based on communication parameters permitted to be used in the frequency use permission procedure. The communication device 110 that performs the frequency usage notification representing the radio system may be the same as or different from the communication device 110 that has performed the procedures explained above. Typically, the communication device 110 notifies the communication control device 130 of a notification message including information capable of specifying the communication device 110.

The frequency use notification is desirably performed periodically until the use of the frequency is rejected from the communication control device 130. In that case, the frequency usage notification is called heartbeat as well.

After receiving the frequency use notification, the communication control device 130 may determine propriety of start or continuation of the frequency use (in other words, radio wave transmission at a permitted frequency). Examples of a determination method include confirmation of the frequency usage information of the primary system. Specifically, it is possible to determine permission or rejection of the start or the continuation of the frequency usage (the radio wave transmission at the permitted frequency) based on a change in a frequency in use of the primary system, a change in a frequency usage situation of a primary system in which radio wave use is not steady (for example, an on-board radar of CBRS of the United States), and the like. If the start or the continuation is permitted, the communication device 110 may start or continue the frequency use (the radio wave transmission at the permitted frequency).

After receiving the frequency use notification, the communication control device 130 may instruct the communication device 110 to reconfigure (reconfiguration) communication parameters. Typically, in the response of the communication control device 130 to the frequency use notification, the reconfiguration of the communication parameters can be instructed. For example, information concerning recommended communication parameters (hereinafter, recommended communication parameter information) can be provided. The communication device 110 to which the recommended communication parameter information has been provided desirably implements the frequency use permission procedure described in <3-4.> again using the recommended communication parameter information.

3-5. Supplement to the Procedures

The procedures explained above do not always need to be implemented individually as explained below. For example, by substituting a third procedure having roles of two different procedures, the two different procedures may be realized. Specifically, for example, the registration request and the available frequency information inquiry request may be integrally notified. For example, the frequency use permission procedure and the frequency use notification may be integrally implemented. Naturally, without being limited to these combinations, three or more procedures may be performed integrally. As explained above, one procedure may be separately implemented a plurality of times.

The expression "acquire" or an expression equivalent thereto in the present disclosure does not always mean to acquire as indicated by the procedure explained in the present disclosure. For example, although it is explained that the position information of the communication device 110 is used in the available frequency evaluation processing, it means that the information acquired in the registration procedure does not always need to be used and, when position information is included in the available frequency inquiry procedure request, the position information may be used. In other words, the procedure for acquisition explained in the present disclosure is an example. Acquisition by other procedures is also permitted within the scope of the present disclosure and within the scope of technical realizability.

The information explained as being included in the response from the communication control device 130 to the communication device 110 may be actively notified from the communication control device 130 by a push scheme if possible. As a specific example, the available frequency information, the recommended communication parameter information, the radio wave transmission continuation rejection notification, and the like may be notified by the push scheme.

3-6. Procedures Concerning the Terminal

The above explanation is made mainly assuming the processing in the communication device 110A. However, depending on an embodiment, not only the communication device 110A but also the terminal device 120 and the communication device 110B can operate under the management of the communication control device 130. That is, a scenario is assumed in which communication parameters are determined by the communication control device 130. Even in such a case, basically, it is possible to use the procedures explained in <3-1.> to <3-4.>. However, unlike the communication device 110A, the terminal device 120 and the communication device 110B need to use a frequency managed by the communication control device 130 for the backhaul link and cannot transmit radio waves without permission. Therefore, it is desirable to start backhaul communication for the purpose of accessing the communication control device 130 only after detecting a radio wave or an authorization signal transmitted by the communication device 110A (the communication device 110 capable of providing a radio communication service or the master communication device 110 in a master-slave scheme).

On the other hand, under the management of the communication control device 130, it is possible that allowable communication parameters are set in the terminal and the communication device 110B as well for the purpose of protecting the primary system. However, the communication control device 130 cannot learn position information and the like of these devices in advance. These devices are highly likely to have mobility. That is, the position information is dynamically updated. Depending on a legal system, when the position information changes by a certain amount or more, re-registration in the communication control device 130 is sometime obliged.

Taking into account such various use forms, operation forms, and the like of the terminal device 120 and the communication device 110, two kinds of communication parameters explained below are specified in the operation form of TVWS (Non Patent Literature 5) decided by the British Office of Communication (Ofcom).

Generic operational parameters
Specific operational parameters

The generic operational parameters are communication parameters defined as "parameters that can be used by all slave WSDs located within a coverage area of a predetermined master WSD (equivalent to the communication device 110)" in Non Patent Literature 5. As an example of characteristics, the generic operational parameters are calculated by WSDB without using the position information of the slave WSDs.

The generic operational parameters can be provided by unicast or broadcast from the communication device 110 that is already permitted to perform radio wave transmission from the communication control device 130. For example, a broadcast signal represented by a Contact Verification Signal (CVS) specified in Part 15 Subpart H of the FCC rule of the United States can be used. Alternatively, the generic operational parameters may be provided by a broadcast signal specific to the radio interface. Consequently, the terminal device 120 and the communication device 110B can be treated as communication parameters used for radio wave transmission for the purpose of accessing the communication control device 130.

The specific operational parameters are communication parameters defined as "parameters usable by a specific slave WSD (White Space Device)" in Non Patent Literature 5. In other words, the specific operational parameters means communication parameters calculated using device parameters of the slave WSD equivalent to the terminal device 120. As a characteristic, the specific operational parameters are calculated by a WSDB (White Space Database) using position information of the slave WSD.

3-7. Procedure Occurring Between Communication Control Devices

3-7-1. Information Exchange

The communication control device 130 can exchange management information with the other communication control devices 130. At least the following information is desirably exchanged.

Information related to the communication device 110
Area information
Protection target system information The information related to the communication device 110 includes at least registration information and communication parameter information of the communication device 110 operating under permission of the communication control device 130. Registration information of the communication device 110 not having permitted communication parameters may be included in the information.

The registration information of the communication device 110 is typically device parameters of the communication device 110 registered in the communication control device 130 in the registration procedure explained above. Not all the registered information does not always need to be exchanged. For example, information likely to correspond to personal information does not need to be exchanged. When the registration information of the communication device 110 is exchanged, the registration information may be encrypted and exchanged or the information may be exchanged after the content of the registration information is made obscure. For example, information converted into a binary value or information signed using an electronic signature mechanism may be exchanged.

The communication parameter information of the communication device 110 typically means information related to communication parameters currently used by the communication device 110. At least information indicating a frequency in use and transmission power is desirably included. Other communication parameters may be included in the communication parameter information.

The area information typically means information indicating a predetermined geographical area. Area information of various attributes can be included in the area information in various forms.

For example, as in PAL Protection Area (PPA) disclosed in Non Patent Document 3 (WINNF-TS-0112), protected area information of the communication device 110 functioning as a high priority secondary system may be included in the area information. The area information in this case can be expressed by, for example, a set of three or more coordinates indicating a geographical position. For example, when a plurality of communication control devices 130 can refer to a common external database, the area information is expressed by a unique ID and an actual geographical area can be referred to from the external database using the ID.

For example, information indicating a coverage of the communication device 110 may be included in the area information. The area information in this case can also be expressed by, for example, a set of three or more coordinates indicating a geographical position. For example, assuming that the coverage is a circle centering on the geographical position of the communication device 110, the area information can also be expressed by information indicating the size of the radius of the circle. For example, when a plurality of communication control devices 130 can refer to a common external database that records area information, the information indicating the coverage is expressed by a unique ID and an actual coverage can be referred to from the external database using the ID.

As another aspect, information related to an area section decided in advance by an administration or the like can also be included in the area information. Specifically, for example, it is possible to indicate a certain area by indicating an address. For example, a license area or the like can be expressed in the same manner.

As still another aspect, the area information does not always need to express a planar area and may express a three-dimensional space. For example, the area information may be expressed using a spatial coordinate system. In addition, for example, information indicating a predetermined closed space such as the number of floors, a floor, and a room number of a building may be used.

Protection target system information means information of a radio system treated as a protection target such as the existing layer (Incumbent Tier) explained above. Examples of a situation in which this information has to be exchanged include a situation in which cross-border coordination is necessary. It is sufficiently conceivable that different protection targets are present in the same band between adjacent countries or regions. In such a case, protection target system information can be exchanged according to necessity among different communication control devices 130 in different countries or regions to which the communication control devices 130 belong.

As another aspect, the protection target system information can include information concerning a secondary licensee and information concerning a radio system operated by the secondary licensee. The secondary licensee specifically means a lessee of the licenses. For example, it is assumed that the secondary licensee borrows a PAL from an owner and operates the radio system owned by the secondary licensee. When the communication control device 130 independently performs rent management, information concerning the secondary licensee and information concerning the radio system operated by the secondary licensee can be exchanged with another communication control device for the purpose of protection.

These kinds of information can be exchanged among the communication control devices 130 irrespective of a decision-making topology applied to the communication control devices 130.

These kinds of information can be exchanged by various schemes. Examples of the schemes are explained below.

ID designation scheme
Period designation scheme
Area designation scheme
Dump scheme The ID designation scheme is a scheme for acquiring, using an ID given in advance to specify information managed by the communication control device 130, information corresponding to the ID. For example, it is assumed that a first communication control device 130 manages the communication device 110 called ID: AAA. At this time, a second communication control device 130 designates the ID: AAA and gives an information acquisition request to the first communication control device 130. After receiving the request, the first communication control device 130 searches for information of ID: AAA and notifies information concerning the communication device 110 of ID: AAA, for example, registration information communication parameter information with a response.

The period designation scheme is a scheme in which information satisfying a predetermined condition can be exchanged in a designated specified period.

Examples of the predetermined condition include presence or absence of update of the information. For example, when acquisition of information concerning the communication device 110 in a specific period is designated by a request, registration information of the communication device 110 registered anew within the specific period can be notified by a response. Registration information of the communication device 110, communication parameters of which have been changed within the specific period, or information of the communication parameters can also be notified by the response.

Examples of the predetermined condition include whether information is recorded by the communication control device 130. For example, when acquisition of information concerning the communication device 110 in a specific period is designated by a request, registration information or information of communication parameters recorded by the communication control device 130 in the period can be notified by a response. When the information is updated in the period, the latest information in the period can be notified. Alternatively, an update history may be notified for each kind of the information.

The area designation scheme is a scheme in which a specific area is designated and information concerning the communication device 110 belonging to the area is exchanged. For example, when acquisition of information concerning the communication device 110 in a specific area is designated by a request, registration information or information of communication parameters of the communication device 110 installed in the area can be notified by a response.

The dump scheme is a scheme for providing all kinds of information recorded by the communication control device 130. At least information related to the communication device 110 and area information are desirably provided by the dump scheme.

All the above explanation about the information exchange among the communication control devices 130 is based on a pull scheme. This is a form in which information corresponding to parameters designated by a request is responded and can be realized by a HTTP GET method as an example. However, the information exchange is not limited to the pull scheme. Information may be actively provided to the other communication control devices 130 by the push scheme. As an example, the push scheme can be realized by a HTTP POST method.

3-7-2. Instruction/Request Procedure

The communication control devices 130 may implement an instruction or a request with each other. Specifically, as an example, reconfiguration of communication parameters of the communication device 110 is exemplified. For example, when it is determined that a first communication device 110 managed by the first communication control device 130 is greatly interfered by a second communication device 110 managed by the second communication control device 130, the first communication control device 130 may request the second communication control device 130 to change communication parameters of the second communication device 110.

As another example, reconfiguration of area information is exemplified. For example, when calculation of coverage information and protection area information concerning the second communication device 110 managed by the second communication control device 130 is defective, the first communication control device 130 may request the second communication control device 130 to reconfigure the area information. Besides the above, a reconfiguration request for the area information may be made for various reasons.

3-8. Information Transmission Means

The notification (signaling) between entities explained above can be realized via various media. The notification is explained using E-UTRA or 5G NR as examples. Naturally, the notification is not limited to these in implementation.

3-8-1. Signaling Between the Communication Control Device 130 and the Communication Device 110

The notification from the communication device 110 to the communication control device 130 may be implemented, for example, in an application layer. For example, the notification may be implemented using HTTP (Hyper Text Transfer Protocol). Signaling can be implemented by describing required parameters in a message body of the HTTP according to a predetermined form. Further, when the HTTP is used, notification from the communication control device 130 to the communication device 110 is also implemented according to a mechanism of a HTTP response.

3-8-2. Signaling Between the Communication Device 110 and the Terminal Device 120

Notification from the communication device 110 to the terminal device 120 may be implemented using, for example, at least any one of radio resource control (RRC) signaling, system information (SI), or downlink control information (DCI). As a downlink physical channel, there are PDCCH: Physical Downlink Control Channel, PDSCH: Physical Downlink Shared Channel, PBCH: Physical Broadcast Channel, NR-PDCCH, NR-PDSCH, NR-PBCH, and the like. The notification may be implemented using at least any one of these.

Notification from the terminal device 120 to the communication device 110 may be implemented using, for example, RRC (Radio Resource Control) signaling or uplink control information (UCI). The notification may be implemented using an uplink physical channel (PUCCH: Physical Uplink Control Channel, PUSCH: Physical Uplink Shared Channel, or PRACH: Physical Random Access Channel).

Signaling is not limited to the physical layer signaling explained above. The signaling may be implemented in a higher layer. For example, when the signaling is implemented in an application layer, the signaling may be implemented by describing required parameters in a message body of the HTTP according to a predetermined form.

3-8-3. Terminal-to-Terminal Signaling

Figure 16:
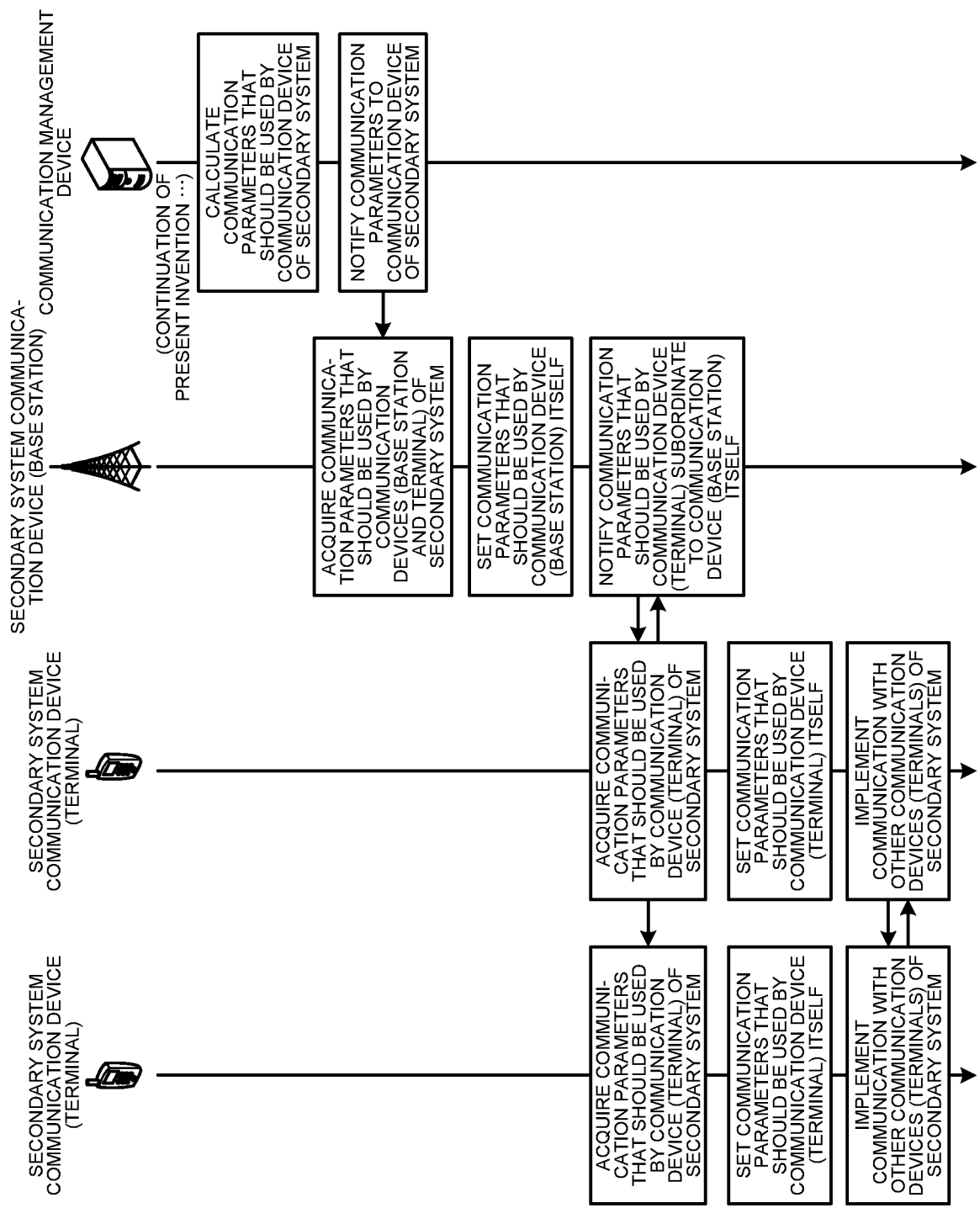
FIG. 16 is a sequence chart illustrating a signaling procedure in the communication network system.

FIG. 16 illustrates an example of a signaling procedure in the case in which terminal-to-terminal communication, D2D (Device-to-Device), and V2X (Vehicle-to-Everything) are assumed as communication of a secondary system. FIG. 16 is a sequence chart illustrating a signaling procedure in the communication network system 100. The terminal-to-terminal communication, D2D, and V2X may be implemented using a physical sidelink channel (PSCCH: Physical Sidelink Control Channel, PSSCH: Physical Sidelink Shared Channel, or PSBCH: Physical Sidelink Broadcast Channel).

When a target frequency channel for frequency sharing is used in a sidelink, communication parameters of the target frequency channel may be notified, acquired, and set in a form linked with a resource pool for the sidelink in the target frequency channel. The resource pool is a radio resource for the sidelink set by a specific frequency resource (for example, a resource block or a component carrier) and a time resource (for example, a radio frame, a subframe, a slot, or a mini-slot). When the resource pool is set in a frequency channel set as a target of frequency sharing, the resource pool is set by at least any one of RRC signaling, system information, or downlink control information from the communication device 110 to the terminal device 120. Communication parameters that should be applied in the resource pool and the sidelink are also set by at least any one of RRC signaling, system information, or downlink control information from the communication device 110 to the terminal device 120. The notification of the setting of the resource pool and the notification of the communication parameters that should be used in the sidelink may be performed simultaneously or individually.

4. OPERATION ACCORDING TO THE PRESENT EMBODIMENT

It is considered that Channel Bandwidth illustrated in FIG. 14 and FIG. 15 is a frequency range linked with Spectrum Grant given to a CBSD. In the present invention, a configuration of a channel is considered as illustrated in FIG. 17.

Figure 17:
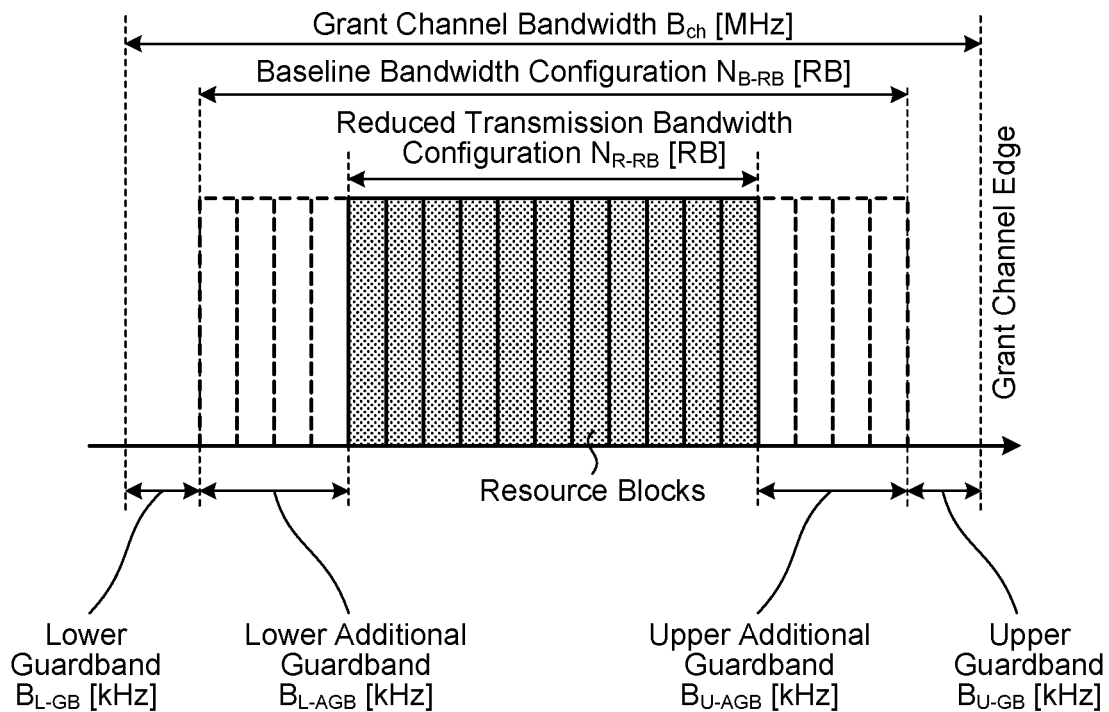
FIG. 17 is a diagram illustrating a channel configuration in the present disclosure.

Grant Channel Bandwidth illustrated in FIG. 17 is a frequency range linked with the Spectrum Grant and is equivalent to Channel Bandwidth in the 3GPP specifications. Baseline Bandwidth Configuration is the number of Resource Blocks (RBs) normally used in radio wave transmission based on the Spectrum Grant and is equivalent to Transmission Bandwidth Configuration in the 3GPP specifications.

Upper Guardband is a guard band set at a channel upper end. Basically, Minimum guardband is applied according to Grant Channel Bandwidth based on the 3GPP specification table. Lower Guardband is a guard band set at a channel lower end. Basically, Minimum guardband is applied according to the Grant Channel Bandwidth based on the 3GPP specification table. In the present invention, Asymmetric is considered to be sufficient in the 3GPP definition. Therefore, Asymmetric is defined individually for generalization. Naturally, the same value may be set.

In the present disclosure, parameters defined anew about a configuration of a channel is explained. Additional Upper Guardband is a guard band additionally set following the Upper Guardband. Additional Lower Guardband is a guard band additionally set following the Lower Guardband. Reduced Transmission Bandwidth Configuration is Transmission Bandwidth after application of the Additional Upper Guardband and the Additional Lower Guardband. Accordingly, a relation of Expression (4) shown below holds.

$$N_{R\text{-}RB} = N_{B\text{-}RB} - B_{U\text{-}AGB} - B_{L\text{-}AGB} \quad (4)$$

With reference to FIG. 18 to FIG. 22, a setting method of Additional Upper Guardband $B_{U\text{-}AGB}$ and Additional Lower Guardband $B_{L\text{-}AGB}$ is explained below about five scenarios. FIG. 18 to FIG. 22 are diagrams illustrating a relationship between a frequency band used by the primary system and a frequency band used by the secondary system.

1. A frequency channel of the secondary system partially overlaps a frequency channel of the primary system.
2. The frequency channel of the secondary system does not completely overlap the frequency channel of the primary system.
3. The frequency channel of the secondary system completely overlaps the frequency channel of the primary system and a frequency channel bandwidth of the secondary system is larger than a frequency channel bandwidth of the primary system.
4. The frequency channel of the secondary system completely overlaps the frequency channel of the primary system and the frequency channel bandwidth of the secondary system is smaller than the frequency channel bandwidth of the primary system.
5. The frequency channel of the secondary system is the same as the frequency channel of the primary system.

<1. A Frequency Channel of the Secondary System Partially Overlaps a Frequency Channel of the Primary System>

Figure 18:
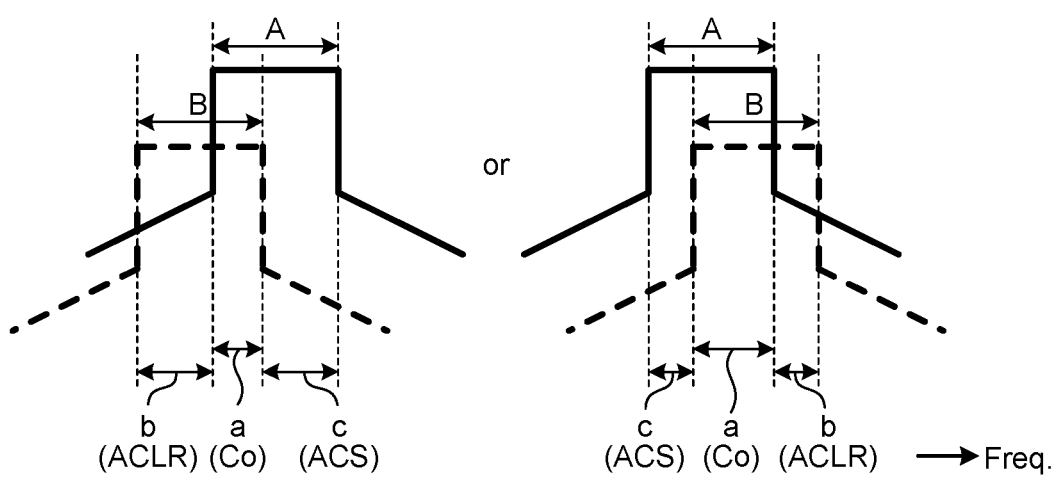
FIG. 18 is a diagram illustrating a relationship between a frequency band used by a primary system and a frequency band used by a secondary system.

This scenario can be illustrated like FIG. 18. ACIR at this time can be calculated by Expression (5) shown below.

$$ACIR_{(dB)} = 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right) \quad (5)$$

At this time, effective given interference power $I_{S \to P\,(dBm)}$ given to the primary system by the secondary system is calculated by Expression (6) shown below.

$$I_{S \to P(dBm)} = I_S(B_{Ch})_{(dBm)} - ACIR_{(dB)} = \quad (6)$$
$$I_S(B_{Ch})_{(dBm)} - 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right)$$

Here, $I_S(B_{Ch})_{(dBm)}$ is same channel interference power in the case in which it is assumed that the primary system uses the same channel as a channel used by the secondary system when a frequency range $B_{Ch}$ [MHz] linked with Spectrum Grant is used.

The effective interference given power $I_{S \to P\,(dBm)}$ only has to be equal to or less than allowable interference power (or interference margin). That is, the effective interference given power $I_{S \to P\,(dBm)}$ can be represented by Expression (7) shown below. Note that Expression (7) is a baseline formula used in the other scenarios.

$$I_{Accept(dBm)} \geq \quad (7)$$
$$I_S(B_{Ch})_{(dBm)} - 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right)$$

At this time, guard band setting is considered. In the case of an example on the left side of FIG. 18 (a center frequency of the secondary system is higher than a center frequency of the primary system), Expression (7) can be modified as Expression (8) shown below.

$$I_{Accept(dBm)} \geq I_S(B_{Ch})_{(dBm)} - \quad (8)$$
$$10\log_{10}\left(\frac{a'}{B_{ch} - B_{LGB}} + \frac{B_{ch} - a'}{B} \cdot 10^{\frac{-ACLR_{(dB)}}{10}} + \frac{B - a'}{B_{ch} - B_{LGB}} \cdot 10^{\frac{-ACS_{(dB)}}{10}}\right)$$

Here, $B_{LGB}$ is a guard band including both $B_{L\text{-}GB}$ and $B_{L\text{-}AGB}$. Based on Expression (8), a minimum value of $B_{LGB}$ can be calculated as indicated by Expression (9) shown below.

$$-I_{Accept(dBm)} + I_S(B_{Ch})_{(dBm)} = \quad (9)$$
$$10\log_{10}\left(\frac{a'}{B_{ch} - B_{LGB}} + \frac{B_{ch} - a'}{B} \cdot 10^{\frac{-ACLR_{(dB)}}{10}} + \frac{B - a'}{B_{ch} - B_{LGB}} \cdot 10^{\frac{-ACS_{(dB)}}{10}}\right)$$
$$-I_{Accept(dBm)} + I_S(B_{Ch})_{(dBm)} =$$
$$10\log_{10}\left(\frac{a'}{B_{ch} - B_{LGB}} + \frac{B_{ch} - a'}{B} \cdot 10^{\frac{-ACLR_{(dB)}}{10}} + \frac{B - a'}{B_{ch} - B_{LGB}} \cdot 10^{\frac{-ACS_{(dB)}}{10}}\right)$$
$$\log_{10}\left(\frac{a'}{B_{ch} - B_{LGB}} + \frac{B_{ch} - a'}{B} \cdot 10^{\frac{-ACLR_{(dB)}}{10}} + \frac{B - a'}{B_{ch} - B_{LGB}} \cdot 10^{\frac{-ACS_{(dB)}}{10}}\right) =$$
$$\frac{-I_{Accept(dBm)} + I_S(B_{Ch})_{(dBm)}}{10}$$
$$\frac{a'}{B_{ch} - B_{LGB}} + \frac{B_{ch} - a'}{B} \cdot 10^{\frac{-ACLR_{(dB)}}{10}} + \frac{B - a'}{B_{ch} - B_{LGB}} \cdot 10^{\frac{-ACS_{(dB)}}{10}} =$$
$$10^{\frac{-I_{Accept(dBm)} + I_S(B_{Ch})_{(dBm)}}{10}}$$
$$\frac{a'}{B_{ch} - B_{LGB}} + \frac{B - a'}{B_{ch} - B_{LGB}} \cdot 10^{\frac{-ACS_{(dB)}}{10}} =$$
$$10^{\frac{-I_{Accept(dBm)} + I_S(B_{Ch})_{(dBm)}}{10}} - \frac{B_{ch} - a'}{B} \cdot 10^{\frac{-ACLR_{(dB)}}{10}}$$

$$\frac{1}{B_{ch}-B_{LGB}} \cdot \left\{ a' + (B-a') \cdot 10^{\frac{-ACS_{(dB)}}{10}} \right\} =$$

$$10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}$$

$$B_{ch} - B_{LGB} = \frac{a' + (B-a')10^{\frac{-ACS_{(dB)}}{10}}}{10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}}$$

$$B_{LGB} = B_{ch} - \frac{a' + (B-a') \cdot 10^{\frac{-ACS_{(dB)}}{10}}}{10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}}$$

Therefore, $B_{L\text{-}AGB}$ can be calculated by Expression (10) shown below. Note that $B_{R\text{-}AGB}$ may be set to 0.

$$B_{L\text{-}AGB} = B_{LGB} - B_{L\text{-}GB} = \tag{10}$$

$$B_{ch} - \frac{a' + (B-a') \cdot 10^{\frac{-ACS_{(dB)}}{10}}}{10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}} - B_{L\text{-}GB}$$

In the case of an example on the right side of FIG. 18 (the center frequency of the secondary system is lower than the center frequency of the primary system) as well, it is possible to calculate the Additional Upper Guardband $B_{R\text{-}AGB}$ in the same manner. Note that, similarly, $B_{L\text{-}AGB}$ can be set to 0.

It is also possible to calculate both of $B_{R\text{-}AGB}$ and $B_{L\text{-}AGB}$ to be set.

When an ACS is not considered, $B_{L\text{-}AGB}$ can be calculated as indicated by Expression (11) shown below by setting ACS→∞.

$$B_{L\text{-}AGB} = \lim_{ACS \to \infty} \left( B_{ch} - \right. \tag{11}$$

$$\left. \frac{a' + (B-a') \cdot 10^{\frac{-ACS_{(dB)}}{10}}}{10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}} - B_{L\text{-}GB} \right) =$$

$$B_{ch} - \frac{a'}{10^{\frac{-I_{Accept(dBm)}+I_S(B_{Ch})_{(dBm)}}{10}} - \frac{B_{ch}-a'}{B} \cdot 10^{\frac{-ACLR_{(dB)}}{10}}} - B_{L\text{-}GB}$$

<2. The Frequency Channel of the Secondary System does not Completely Overlap the Frequency Channel of the Primary System>

Figure 19:
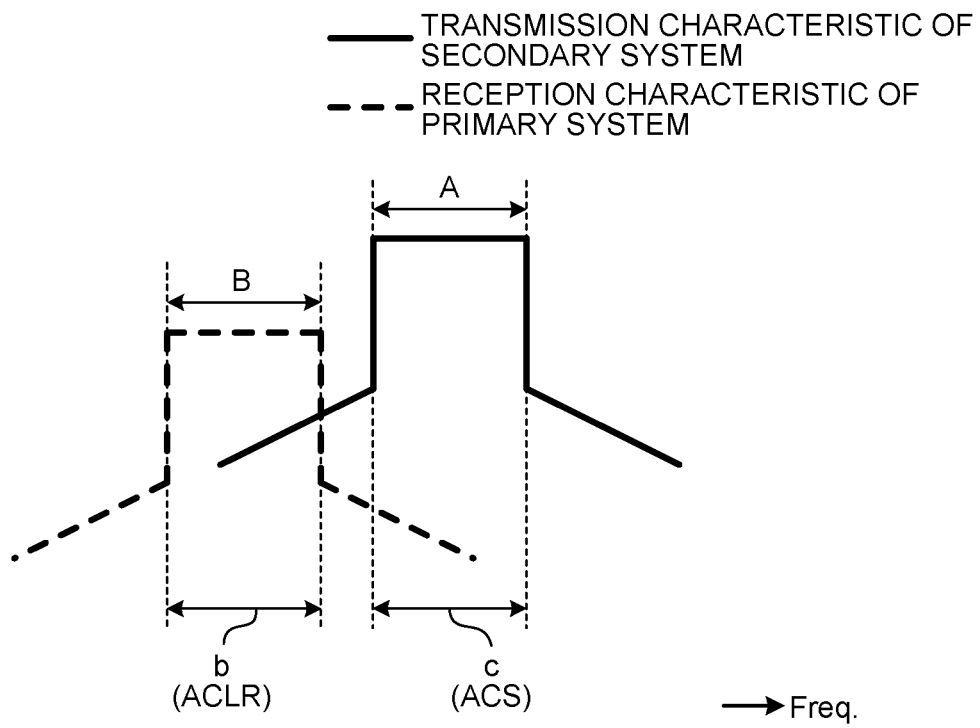
FIG. 19 is a diagram illustrating a relationship between a frequency band used by the primary system and a frequency band used by the secondary system.

This scenario can be illustrated like FIG. 19.

The ACIR at this time can be calculated by Expression (12) shown below.

$$ACIR_{(dB)} = 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right) = \tag{12}$$

$$10\log_{10}\left(10^{\frac{-ACLR_{(dB)}}{10}} + 10^{\frac{-ACS_{(dB)}}{10}}\right)$$

In this case, when a bandwidth after guard band setting is represented as $B'_{ch}$, Expression (13) shown below holds.

$$I_{Accept(dBm)} \geq \tag{13}$$

$$I_S(B_{Ch})_{(dBm)} - 10\log_{10}\left(10^{\frac{-ACLR_{(dB)}}{10}} + 10^{\frac{-ACS_{(dB)}}{10}}\right) - 10\log_{10}\left(\frac{B'_{Ch}}{B_{Ch}}\right)$$

Therefore, $B'_{ch}$ can be calculated by Expression (14) shown below.

$$\log_{10}\left(\frac{B'_{Ch}}{B_{Ch}}\right) = \frac{-\left(I_{Accept(dBm)} - I_S(B_{Ch})_{(dBm)} + 10\log_{10}\left(10^{\frac{-ACLR_{(dB)}}{10}} + 10^{\frac{-ACS_{(dB)}}{10}}\right)\right)}{10} \tag{14}$$

$$B'_{Ch} = B_{Ch} \cdot 10^{\frac{-\left(I_{Accept(dBm)} - I_S(B_{Ch})_{(dBm)} + 10\log_{10}\left(10^{\frac{-ACLR_{(dB)}}{10}} + 10^{\frac{-ACS_{(dB)}}{10}}\right)\right)}{10}}$$

Here, since $B'_{ch}$ is $B_{ch}$-$B_{R\text{-}AGB}$-$B_{L\text{-}AGB}$, Expression (15) shown below is obtained.

$$B_{Ch} - B_{R\text{-}AGB} - B_{L\text{-}AGB} = \tag{15}$$

$$B_{Ch} \cdot 10^{\frac{-\left(I_{Accept(dBm)} - I_S(B_{Ch})_{(dBm)} + 10\log_{10}\left(10^{\frac{-ACLR_{(dB)}}{10}} + 10^{\frac{-ACS_{(dB)}}{10}}\right)\right)}{10}}$$

$$B_{R\text{-}AGB} + B_{L\text{-}AGB} =$$

$$B_{Ch} - B_{Ch} \cdot 10^{\frac{-\left(I_{Accept(dBm)} - I_S(B_{Ch})_{(dBm)} + 10\log_{10}\left(10^{\frac{-ACLR_{(dB)}}{10}} + 10^{\frac{-ACS_{(dB)}}{10}}\right)\right)}{10}}$$

$B_{R\text{-}AGB}$ and $B_{L\text{-}AGB}$ may be optionally set based on Expression (15).

For example, when widths are equal, $B_{R\text{-}AGB}$ and $B_{L\text{-}AGB}$ are respective represented by Expression (16) shown below.

$$\frac{B_{Ch} - B_{Ch} \cdot 10^{\frac{-\left(I_{Accept(dBm)} - I_S(B_{Ch})_{(dBm)} + 10\log_{10}\left(10^{\frac{-ACLR_{(dB)}}{10}} + 10^{\frac{-ACS_{(dB)}}{10}}\right)\right)}{10}}}{2} \tag{16}$$

<3. The Frequency Channel of the Secondary System Completely Overlaps the Frequency Channel of the Primary System and a Frequency Channel Bandwidth of the Secondary System is Larger than a Frequency Channel Bandwidth of the Primary System>

Figure 20:
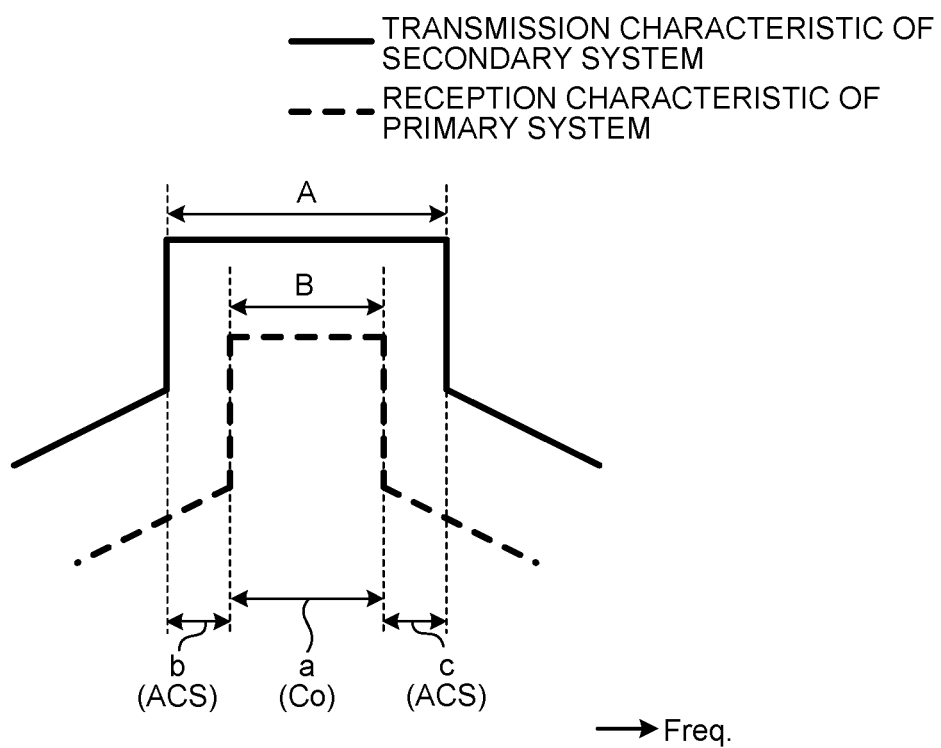
FIG. 20 is a diagram illustrating a relationship between a frequency band used by the primary system and a frequency band used by the secondary system.

This scenario can be illustrated as indicated by FIG. 20 shown below.

The ACIR at this time can be calculated by Expression (17) shown below.

$$ACIR_{(dB)} = 10\log_{10}\left(\frac{a}{A} + \frac{b+c}{A} \cdot 10^{\frac{-ACS_{(dB)}}{10}}\right) \tag{17}$$

When the total amount of the guard bands is represented as $B_{GB}$, Expression (18) shown below holds.

$$I_{Accept(dBm)} \geq I_S(B_{Ch})_{(dBm)} - 10\log_{10}\left(\frac{a}{A} + \frac{b+c}{A} \cdot 10^{\frac{-ACS_{(dB)}}{10}}\right) = \quad (18)$$

$$I_S(B_{Ch})_{(dBm)} - 10\log_{10}\left(\frac{B}{B_{ch} - B_{GB}} + \frac{B_{ch} - B_{GB} - B}{B_{ch} - B_{GB}} \cdot 10^{\frac{-ACS_{(dB)}}{10}}\right)$$

As a result, Expression (19) shown below is derived from Expression (18).

$$\log_{10}\left(\frac{B}{B_{ch} - B_{GB}} + \frac{B_{ch} - B_{GB} - B}{B_{ch} - B_{GB}} \cdot 10^{\frac{-ACS_{(dB)}}{10}}\right) = \quad (19)$$

$$\frac{-(I_{Accept(dBm)} - I_S(B_{Ch})_{(dBm)})}{10}$$

$$\frac{B}{B_{ch} - B_{GB}} + \frac{B_{ch} - B_{GB} - B}{B_{ch} - B_{GB}} \cdot 10^{\frac{-ACS_{(dB)}}{10}} = 10^{\frac{-(I_{Accept(dBm)} - I_S(B_{Ch})_{(dBm)})}{10}}$$

Here, since $B_{ch} - B_{GB} > 0$, $B_{GB}$ can be calculated by Expression (20) shown below.

$$B + (B_{ch} - B_{GB} - B) \cdot 10^{\frac{-ACS_{(dB)}}{10}} = \quad (20)$$

$$(B_{ch} - B_{GB}) \cdot 10^{\frac{-(I_{Accept(dBm)} - I_S(B_{Ch})_{(dBm)})}{10}}$$

$$B + (B_{ch} - B_{GB}) \cdot 10^{\frac{-ACS_{(dB)}}{10}} - B \cdot 10^{\frac{-ACS_{(dB)}}{10}} =$$

$$(B_{ch} - B_{GB}) \cdot 10^{\frac{-(I_{Accept(dBm)} - I_S(B_{Ch})_{(dBm)})}{10}}$$

$$B \cdot \left(1 - 10^{\frac{-ACS_{(dB)}}{10}}\right) =$$

$$(B_{ch} - B_{GB}) \cdot \left(10^{\frac{-(I_{Accept(dBm)} - I_S(B_{Ch})_{(dBm)})}{10}} - 10^{\frac{-ACS_{(dB)}}{10}}\right)$$

$$B \cdot \left(1 - 10^{\frac{-ACS_{(dB)}}{10}}\right) =$$

$$(B_{ch} - B_{GB}) \cdot \left(10^{\frac{-(I_{Accept(dBm)} - I_S(B_{Ch})_{(dBm)})}{10}} - 10^{\frac{-ACS_{(dB)}}{10}}\right)$$

$$B_{GB}\left(10^{\frac{-(I_{Accept(dBm)} - I_S(B_{Ch})_{(dBm)})}{10}} - 10^{\frac{-ACS_{(dB)}}{10}}\right) =$$

$$B_{Ch}\left(10^{\frac{-(I_{Accept(dBm)} - I_S(B_{Ch})_{(dBm)})}{10}} - 10^{\frac{-ACS_{(dB)}}{10}}\right) - B\left(1 - 10^{\frac{-ACS_{(dB)}}{10}}\right)$$

$$B_{GB} = \frac{B_{Ch}\left(10^{\frac{-(I_{Accept(dBm)} - I_S(B_{Ch})_{(dBm)})}{10}} - 10^{\frac{-ACS_{(dB)}}{10}}\right) - B\left(1 - 10^{\frac{-ACS_{(dB)}}{10}}\right)}{10^{\frac{-(I_{Accept(dBm)} - I_S(B_{Ch})_{(dBm)})}{10}} - 10^{\frac{-ACS_{(dB)}}{10}}}$$

$B_{R-AGB}$ and $B_{L-AGB}$ may be optionally set based on Expression (20).

For example, when widths are equal, $B_{R-AGB}$ and $B_{L-AGB}$ are represented by Expression (21) shown below.

$$\frac{B_{Ch}\left(10^{\frac{-(I_{Accept(dBm)} - I_S(B_{Ch})_{(dBm)})}{10}} - 10^{\frac{-ACS_{(dB)}}{10}}\right) - B\left(1 - 10^{\frac{-ACS_{(dB)}}{10}}\right)}{10^{\frac{-(I_{Accept(dBm)} - I_S(B_{Ch})_{(dBm)})}{10}} - 10^{\frac{-ACS_{(dB)}}{10}}} - B_{R-GB} - B_{L-GB} \quad (21)$$

$$\frac{}{2}$$

<4. The Frequency Channel of the Secondary System Completely Overlaps the Frequency Channel of the Primary System and the Frequency Channel Bandwidth of the Secondary System is Smaller than the Frequency Channel Bandwidth of the Primary System>

Figure 21:
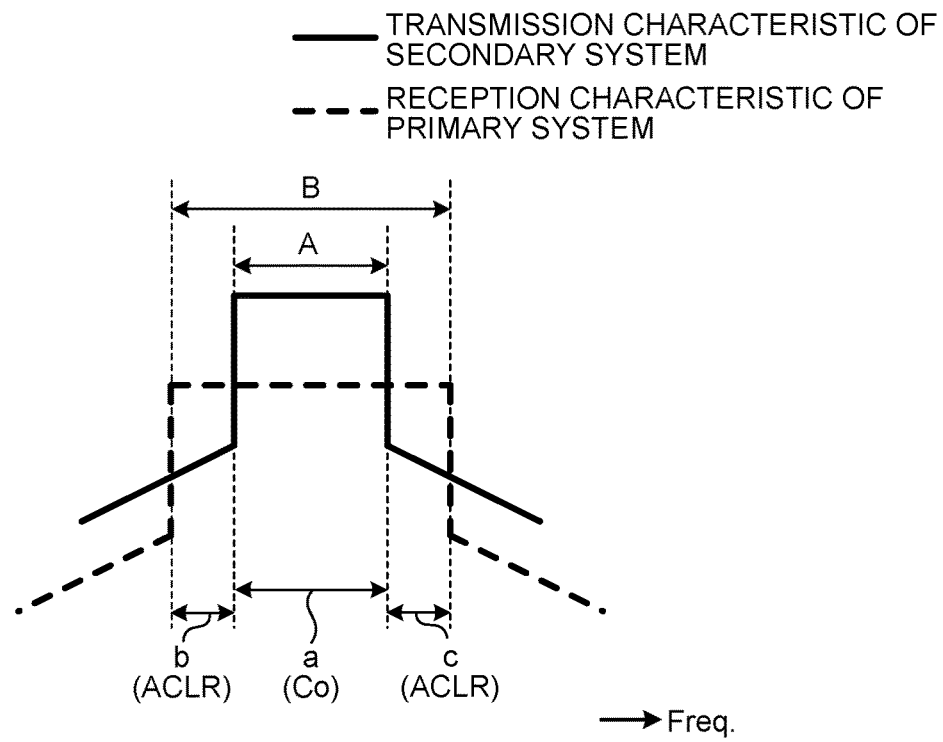
FIG. 21 is a diagram illustrating a relationship between a frequency band used by the primary system and a frequency band used by the secondary system.

This scenario can be illustrated like FIG. 21.

The ACIR at this time can be calculated by Expression (22) shown below.

$$ACIR_{(dB)} = 10\log_{10}\left(\frac{a}{A} + \frac{b+c}{B} \cdot 10^{\frac{-ACLR_{(dB)}}{10}}\right) \quad (22)$$

Like the scenario 3 illustrated in FIG. 20, when a total amount of the guard band is represented as $B_{GB}$, Expression (23) shown below holds.

$$I_{Accept(dBm)} \geq I_S(B_{Ch})_{(dBm)} - 10\log_{10}\left(\frac{a}{A} + \frac{b+c}{A} \cdot 10^{\frac{-ACLR_{(dB)}}{10}}\right) = \quad (23)$$

$$I_S(B_{Ch})_{(dBm)} - 10\log_{10}\left(1 + \frac{B - B_{ch} - B_{GB}}{B} \cdot 10^{\frac{-ACLR_{(dB)}}{10}}\right)$$

When Expression (23) is solved, Expression (24) shown below is derived.

$$\log_{10}\left(1 + \frac{B - B_{Ch} - B_{GB}}{B} \cdot 10^{\frac{-ACLR_{(dB)}}{10}}\right) = \frac{-(I_{Accept(dBm)} - I_S(B_{Ch})_{(dBm)})}{10} \quad (24)$$

$$1 + \frac{B - B_{Ch} - B_{GB}}{B} \cdot 10^{\frac{-ACLR_{(dB)}}{10}} = 10^{\frac{-(I_{Accept(dBm)} - I_S(B_{Ch})_{(dBm)})}{10}}$$

$$1 + \frac{B - B_{Ch}}{B} \cdot 10^{\frac{-ACLR_{(dB)}}{10}} - 10^{\frac{-(I_{Accept(dBm)} - I_S(B_{Ch})_{(dBm)})}{10}} =$$

$$\frac{B_{GB}}{B} \cdot 10^{\frac{-ACLR_{(dB)}}{10}}$$

$$B_{GB} =$$

$$\frac{B}{10^{\frac{-ACLR_{(dB)}}{10}}} \cdot \left\{1 + \frac{B - B_{Ch}}{B} \cdot 10^{\frac{-ACLR_{(dB)}}{10}} - 10^{\frac{-(I_{Accept(dBm)} - I_S(B_{Ch})_{(dBm)})}{10}}\right\}$$

$B_{R-AGB}$ and $B_{L-AGB}$ may be optionally set based on Expression (24).

For example, when widths are equal, $B_{R-AGB}$ and $B_{L-AGB}$ are respectively represented by Expression (25) shown below.

$$\frac{\frac{B}{10^{\frac{-ACLR_{(dB)}}{10}}} \cdot \left\{1 + \frac{B - B_{Ch}}{B} \cdot 10^{\frac{-ACLR_{(dB)}}{10}} - 10^{\frac{-(I_{Accept(dBm)} - I_S(B_{Ch})_{(dBm)})}{10}}\right\} - B_{R-GB} - B_{L-GB}}{2} \quad (25)$$

<5. The Frequency Channel of the Secondary System is the Same as the Frequency Channel of the Primary System>

Figure 22:
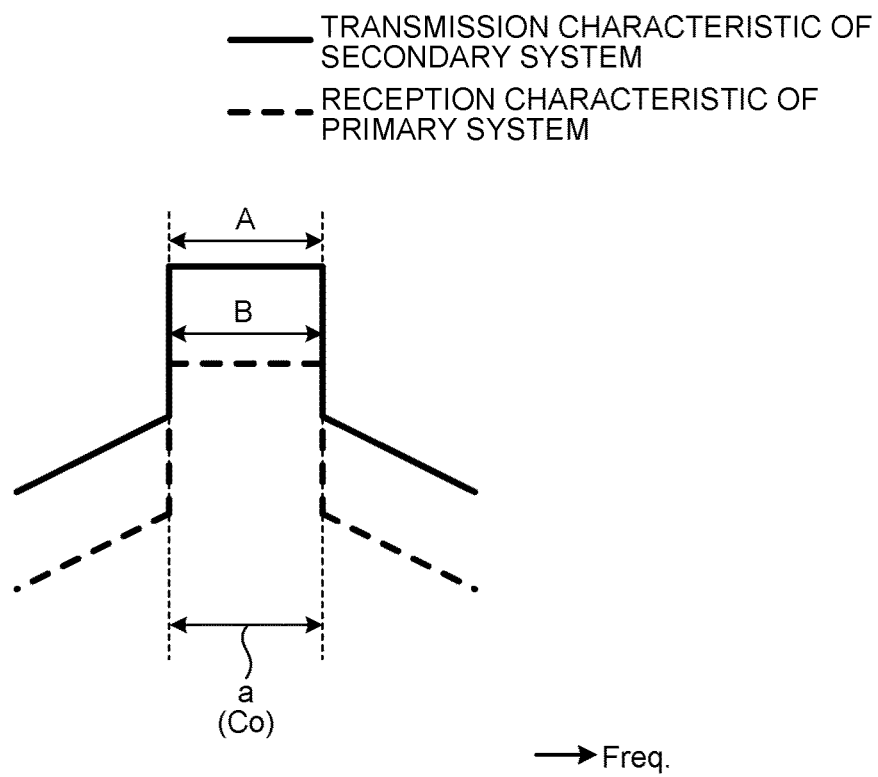
FIG. 22 is a diagram illustrating a relationship between a frequency band used by the primary system and a frequency band used by the secondary system.

This scenario can be illustrated like FIG. 22.

The ACIR at this time is represented by Expression (26) shown below.

$$ACIR(dB) = 0 \quad (26)$$

As in the scenario 2 illustrated in FIG. 19, in this case, when the bandwidth after the guard band setting is represented as $B'_{ch}$, Expression (27) shown below holds.

$$I_{Accept(dBm)} \geq I_S(B_{Ch})_{(dBm)} - 10\log_{10}\left(\frac{B'_{Ch}}{B_{Ch}}\right) \quad (27)$$

Therefore, $B'_{ch}$ can be calculated by Expression (28) shown below.

$$\log_{10}\left(\frac{B'_{Ch}}{B_{Ch}}\right) = \frac{-(I_{Accept(dBm)} - I_S(B_{Ch})_{(dBm)})}{10} \quad (28)$$

$$B'_{Ch} = B_{Ch} \cdot 10^{\frac{-(I_{Accept(dBm)} - I_S(B_{Ch})_{(dBm)})}{10}}$$

Here, since $B'_{ch}$ is $Bch-B_{R-AGB}-B_{L-AGB}$, Expression (29) shown below is obtained.

$$B_{Ch} - B_{R-AGB} - B_{L-AGB} = B_{Ch} \cdot 10^{\frac{-(I_{Accept(dBm)} - I_S(B_{Ch})_{(dBm)})}{10}} \quad (29)$$

$$B_{R-AGB} + B_{L-AGB} = B_{Ch} - B_{Ch} \cdot 10^{\frac{-(I_{Accept(dBm)} - I_S(B_{Ch})_{(dBm)})}{10}}$$

$B_{R-AGB}$ and $B_{L-AGB}$ may be optionally set based on Expression (29).

For example, when the widths are equal, $B_{R-AGB}$ and $B_{L-AGB}$ are represented by Expression (30) shown below.

$$\frac{B_{Ch} - B_{Ch} \cdot 10^{\frac{-(I_{Accept(dBm)} - I_S(B_{Ch})_{(dBm)})}{10}}}{2} \quad (30)$$

The method of setting the guard band is explained above.

Naturally, the calculation result is not always applied as it is. The following processing or action may be performed on the calculation result.

For example, when a calculation result of a guard band is not an integral multiple of the resource block, a nearest numerical value among numerical values of the integral multiple of the resource block larger than the calculation result is set as a guard band size to be finally applied.

When the calculation result of the guard band exceeds a predetermined threshold, any one of (1) to (4) described below is implemented.

(1) Instruct the secondary system to reacquire Grant with a channel size (a frequency range) after application of the calculation result. This is because, from the viewpoint of frequency use efficiency, an unused portion excessively occurs with respect to an allocated bandwidth. Therefore, the frequency use efficiency can be improved by reacquiring the Grant.

(2) Present reacquisition of the Grant in a different frequency range to the secondary system. At this time, a calculation result may be notified to the secondary system.

(3) Terminate the Grant.

(4) Do not set a guard band. An interference reduction by downward adjustment of maximum transmission power linked with the Grant is attempted.

When a guard band size is notified, a secondary system base station sets Reduced Transmission Bandwidth Configuration based on the notified guard band size. At this time, scheduling or handover into the Reduced Transmission Bandwidth Configuration may be performed on a UE that is using a Reduced Resource Block.

Here, for the notification of the guard band size, (1) or (2) described below may be performed.

(1) Notify, as upper and lower guard band information, the number of upper and lower Resource Blocks that should be cut.

(2) Notify, as the upper and lower guard band information, upper and lower frequency bandwidths that should be cut.

Note that, when the number of Resource Blocks is notified, Numerology information (μ, Subcarrier spacing, and the like) is acquired from a base station in advance.

When the number of Resource Blocks is notified, when a calculation result is not an integral multiple of the number of Resource Blocks, a nearest numerical value among numerical values of the integral multiple of the number of Resource Blocks larger than the calculation result is set as a guard band size to be finally applied.

A trigger of the guard band calculation is considered to be, for example, when a predetermined request (for example, Registration Request, Grant Request, Spectrum Inquiry Request, or Heartbeat Request) is received at the time of CPAS, when configuration information of radio communication is received anew in this request, or when configuration information is updated. Accordingly, a minimum guard band is acquired beforehand from the base station. Additional upper and lower guard bandwidths (or the number of upper and lower Resource Blocks that should be cut and upper and lower frequency bands that should be deleted) are notified to a protection target system.

Note that, when the minimum guard band is notified from the base station, an additional guard band only has to be transmitted. On the other hand, when the minimum guard band is not notified, a guard band total amount ($B_{LGB}$ and $B_{RGB}$ in the above expression) is returned.

5. MODIFICATIONS

The communication control device 130 in the present embodiment is not limited to the device explained in the embodiment. For example, the communication control device 130 may be a device having a function other than the function of controlling the communication device 110 that secondarily uses a frequency band in which frequency sharing is performed. For example, a network manager may have the function of the communication control device 130 in the present embodiment. At this time, the network manager may be, for example, a C-BBU (Centralized Base Band Unit) having a network configuration called C-RAN (Centralized Radio Access Network) or a device including the C-BBU. A base station (including an access point) may have the function of the network manager. These devices (the network manager and the like) can also be regarded as communication control devices.

In the embodiment explained above, the communication control device 130 is the device belonging to the communication network system 100. However, the communication control device 130 may not always be the device belonging to the communication network system 100. The communication control device 130 may be a device on the outside of the communication network system 100. The communication control device 130 may indirectly control the communication device 110 via a device configuring the communication network system 100 without directly controlling the communication device 110. A plurality of secondary systems (communication network systems 100) may be present. At this time, the communication control device 130 may manage a plurality of secondary systems. In this case, each of the secondary systems can be regarded as the second radio system.

Note that, in general, in frequency sharing, an existing system that uses a target band is referred to as primary system and a secondary user is referred to as secondary system. However, the primary system and the secondary system may be replaced with different terms. A macro cell in a HetNET (Heterogeneous Network) may be set as the primary system and a small cell or a relay station in the HetNET may be set as the secondary system. The base station may be set as the primary system and Relay UE (Relay User Equipment) or Vehicle UE (Vehicle User Equipment) that realizes D2D or V2X (Vehicle-to-Everything) present in a coverage of the base station may be set as the secondary system. The base station is not limited to a fixed type and may be a portable/mobile type.

Further, an interface between entities may be either wired or wireless. For example, the interface among the entities (the communication device, the communication control device, or the terminal device) appearing in the present embodiment may be a radio interface that does not depend on frequency sharing. Examples of the radio interface that does not depend on frequency sharing include a radio communication line provided by a mobile communication carrier via a licensed band and wireless LAN communication that uses an existing license-exempt band.

The control device that controls the terminal device 120, the communication device 110, the intermediate device 110C, or the communication control device 130 in the present embodiment may be realized by a dedicated computer system or may be realized by a general-purpose computer system.

For example, a program for executing the operation explained above is stored in a computer-readable recording medium such as an optical disk, a semiconductor memory, a magnetic tape, or a flexible disk and distributed. Then, for example, the program is installed in a computer. The control device is configured by executing processing explained above. At this time, the control device may be a device (for example, a personal computer) on the outside of the terminal device 120, the communication device 110, or the intermediate device 110C, or the communication control device 130. The control device may be a device (for example, the control unit 124, the control unit 114, the control unit 114*c*, or the control unit 134) on the inside of the terminal device 120, the communication device 110, the intermediate device 110C, or the communication control device 130.

The communication program explained above may be stored in a disk device included in a server device on a network such as the Internet such that the communication program can be downloaded to a computer. The functions explained above may be realized by cooperation of an OS (Operating System) and application software. In this case, a portion other than the OS may be stored in a medium and distributed or a portion other than the OS may be stored in the server device and downloaded to the computer.

Among the processing explained in the embodiment, all or a part of the processing explained as being automatically performed can be manually performed or all or a part of the processing explained as being manually performed can be automatically performed by a known method. Besides, the processing procedure, the specific names, and the information including the various data and parameters explained in the document and illustrated in the drawings can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be functionally or physically distributed and integrated in any unit according to various loads, usage situations, and the like.

The embodiments explained above can be combined as appropriate in a region in which the processing content do not contradict. The order of the steps illustrated in the sequence chart or the flowchart in the present embodiment can be changed as appropriate.

For example, the present embodiment can be realized as any component configuring a device or a system, for example, a processor functioning as a system LSI (Large Scale Integration) or the like, a module that uses a plurality of processors or the like, a unit that uses a plurality of modules or the like, or a set obtained by further adding other functions to the unit (that is, a component as a part of the device).

Note that, in the present embodiment, the system means a set of a plurality of components (devices, modules (parts), and the like) and it does not matter whether all the components are present in the same housing. For example, both of a plurality of devices housed in separate housings and connected via a network or the like and one device in which a plurality of modules are housed in one housing are systems.

For example, the present embodiment can adopt a configuration of cloud computing in which one function is shared and processed by a plurality of devices in cooperation via a network.

6. CONCLUSION

As explained above, according to an embodiment of the present disclosure, the communication control device 130 includes the interference ratio calculating unit 1342 that calculates an adjacent channel interference ratio between the first radio system, which is the protection target, and the second radio system, which is the interference source, when the second radio system shares and uses a radio wave used by the first radio system and the guard band calculating unit 1343 that calculates a guard band necessary for a channel of the first radio system or the second radio system based on the adjacent channel interference ratio. Consequently, it is possible to appropriately set the guard band for the purpose of upper layer protection and network coexistence in which adjacent channel interference is considered.

Although the embodiments of the present disclosure explained above, the technical scope of the present disclosure is not limited to the embodiments per se. Various changes can be made without departing from the gist of the present disclosure. Components in different embodiments and modifications may be combined as appropriate.

The effects in the embodiments explained in this specification are only illustrations and are not limited. Other effects may be present.

Note that the present technique can also take the following configurations.

(1) A communication control device comprising:
an interference ratio calculating unit that calculates an adjacent channel interference ratio between a first radio system, which is a protection target, and a second radio system, which is an interference source, when the second radio system shares and uses a part or an entire frequency band used by the first radio system; and
a guard band calculating unit that calculates a guard band necessary for a channel of the first radio system or the second radio system based on the adjacent channel interference ratio.
(2) The communication control device according to the above-described (1), wherein the interference ratio calculating unit
calculates the adjacent channel interference ratio with a calculation method corresponding to an overlapping situation of a frequency channel used by the first radio system and a frequency channel used by the second radio system.
(3) The communication control device according to the above-described (1) to (2), further comprising a notifying unit that notifies the first radio system or the second radio system of guard band information corresponding to a calculation result of the guard band calculating unit.
(4) The communication control device according to the above-described (3), wherein the guard band information is
information indicating a size of the guard band that should be set in the channel.
(5) The communication control device according to the above-described (4), wherein the information indicating the size of the guard band is
information indicating a number of resource blocks.
(6) The communication control device according to the above-described (4) to (5), wherein the information indicating the size of the guard band is
information indicating a frequency bandwidth.
(7) The communication control device according to the above-described (5) to (6), further comprising an acquiring unit that acquires numerology information of the first radio system or the second radio system, wherein
the notifying unit
notifies the guard band information including information indicating the number of resource blocks corresponding to the numerology information.
(8) The communication control device according to the above-described (5) to (7), wherein, when a calculation result of the guard band calculating unit is not an integral multiple of the number of resource blocks,
the notifying unit
notifies a number of integral multiples larger than the calculation result as the number of resource blocks.
(9) The communication control device according to the above-described (8), wherein
the notifying unit
notifies a number of nearest integral multiples larger than the calculation result as the number of resource blocks.
(10) The communication control device according to the above-described (1) to (9), wherein, when receiving a predetermined request,
the guard band calculating unit
performs calculation processing for the guard band.
(11) The communication control device according to the above-described (10), wherein, when receiving configuration information related to radio communication in the predetermined request,
the guard band calculating unit
performs the calculation processing for the guard band.

(12) A communication control method comprising:
calculating an adjacent channel interference ratio between a first radio system, which is a protection target, and a second radio system, which is an interference source, when the second radio system shares and uses a part or an entire frequency band used by the first radio system; and
calculating a guard band necessary for a channel of the first radio system or the second radio system based on the adjacent channel interference ratio.

REFERENCE SIGNS LIST

100 COMMUNICATION NETWORK SYSTEM
110 COMMUNICATION DEVICE
110C INTERMEDIATE DEVICE
120 TERMINAL DEVICE
130 COMMUNICATION CONTROL DEVICE
1341 ACQUIRING UNIT
1342 INTERFERENCE RATIO CALCULATING UNIT
1343 GUARD BAND CALCULATING UNIT
1344 NOTIFYING UNIT

The invention claimed is:
1. A communication control device, comprising:
an interference ratio calculating unit configured to calculate an adjacent channel interference ratio between a first radio system, which is a protection target, and a second radio system, which is an interference source, wherein the adjacent channel interference ratio is calculated in a case where the second radio system shares and uses a part or an entire frequency band used by the first radio system;
a guard band calculating unit configured to calculate a guard band, necessary for a channel of the first radio system and the second radio system, based on the adjacent channel interference ratio;
a notifying unit configured to notify the first radio system and the second radio system of guard band information corresponding to a first calculation result of the guard band calculating unit, wherein
the second radio system sets a reduced transmission bandwidth configuration based on the notified guard band information, and
a specific terminal device of the second radio system is with a reduced resource blocks based on the set reduced transmission bandwidth configuration; and
the notifying unit is further configured to notify to the second radio system a number of the reduced resource blocks that are reduced in the specific terminal device as the guard band information.
2. The communication control device according to claim 1, wherein the interference ratio calculating unit is further configured to calculate the adjacent channel interference ratio with a calculation method corresponding to an overlapping situation of a first frequency channel used by the first radio system and a second frequency channel used by the second radio system.
3. The communication control device according to claim 1, wherein the guard band information indicates a size of the guard band set in the channel.
4. The communication control device according to claim 3, wherein the information indicating the size of the guard band further indicates a number of resource blocks of the guard band.

5. The communication control device according to claim 3, wherein the information indicating the size of the guard band further indicates a frequency bandwidth of the guard band.

6. The communication control device according to claim 4, further comprising an acquiring unit configured to acquire numerology information of the first radio system or the second radio system, wherein
the notifying unit is further configured to notify the guard band information which indicates the number of resource blocks corresponding to the numerology information.

7. The communication control device according to claim 4, wherein, in a case where a second calculation result of the guard band calculating unit is not an integral multiple of the number of resource blocks,
the notifying unit is further configured to notify a number of integral multiples larger than the second calculation result as the number of resource blocks.

8. The communication control device according to claim 7, wherein
the notifying unit is further configured to notify a number of nearest integral multiples larger than the second calculation result as the number of resource blocks.

9. The communication control device according to claim 1, wherein, based on reception of a specific request,
the guard band calculating unit is further configured to calculate the guard band.

10. The communication control device according to claim 9, wherein, based on reception of configuration information of radio communication in the specific request, the guard band calculating unit is further configured to calculate the guard band.

11. A communication control method, comprising:
calculating an adjacent channel interference ratio between a first radio system, which is a protection target, and a second radio system, which is an interference source, wherein the adjacent channel interference ratio is calculated in a case where the second radio system shares and uses a part or an entire frequency band used by the first radio system;
calculating a guard band, necessary for a channel of the first radio system and the second radio system, based on the adjacent channel interference ratio;
notifying the first radio system and the second radio system of guard band information corresponding to a calculation result of the calculated guard band, wherein
the second radio system sets a reduced transmission bandwidth configuration based on the notified guard band information, and
a specific terminal device of the second radio system is with a reduced resource blocks based on the set reduced transmission bandwidth configuration; and
notifying to the second radio system a number of the reduced resource blocks that are reduced in the specific terminal device as the guard band information.

* * * * *